US008169703B1

(12) United States Patent
Mossberg et al.

(10) Patent No.: US 8,169,703 B1
(45) Date of Patent: May 1, 2012

(54) MONOLITHIC ARRAYS OF DIFFRACTION GRATINGS

(75) Inventors: Thomas W. Mossberg, Eugene, OR (US); Dmitri Iazikov, Eugene, OR (US); Christoph M. Greiner, Eugene, OR (US)

(73) Assignee: LightSmyth Technologies Inc., Eugene, OR (US)

( * ) Notice: Subject to any disclaimer, the term of this patent is extended or adjusted under 35 U.S.C. 154(b) by 580 days.

(21) Appl. No.: 11/851,389

(22) Filed: Sep. 6, 2007

Related U.S. Application Data

(60) Provisional application No. 60/842,793, filed on Sep. 6, 2006, provisional application No. 60/921,561, filed on Apr. 3, 2007.

(51) Int. Cl.
*G02B 5/18* (2006.01)
(52) U.S. Cl. ...................................... 359/569
(58) Field of Classification Search ............... 359/566, 359/569; 385/10, 37; 398/84, 87, 149, FOR. 121; 372/50.11, 102; 250/237 R, 237 G
See application file for complete search history.

(56) References Cited

U.S. PATENT DOCUMENTS

| | | | | |
|---|---|---|---|---|
| 3,488,124 | A * | 1/1970 | Lamberts et al. | 356/71 |
| 4,094,575 | A * | 6/1978 | Kellie | 359/10 |
| 6,256,436 | B1 * | 7/2001 | Nakama | 385/37 |
| 6,285,813 | B1 * | 9/2001 | Schultz et al. | 385/37 |
| 6,312,961 | B1 * | 11/2001 | Voirin et al. | 436/518 |
| 6,314,220 | B1 * | 11/2001 | Mossberg et al. | 385/37 |
| 6,563,966 | B1 * | 5/2003 | Tang | 385/10 |
| 6,606,432 | B2 * | 8/2003 | Gaylord et al. | 385/37 |
| 6,674,928 | B2 * | 1/2004 | Johnson et al. | 385/12 |
| 6,678,429 | B2 * | 1/2004 | Mossberg et al. | 385/10 |
| 6,747,798 | B2 * | 6/2004 | Kristensen et al. | 359/566 |
| 6,822,217 | B1 * | 11/2004 | Murgatroyd et al. | 250/227.14 |
| 6,823,115 | B2 * | 11/2004 | Greiner et al. | 385/37 |
| 6,829,417 | B2 * | 12/2004 | Greiner et al. | 385/37 |
| 6,859,318 | B1 * | 2/2005 | Mossberg | 359/569 |
| 6,879,441 | B1 * | 4/2005 | Mossberg | 359/569 |
| 6,885,792 | B2 * | 4/2005 | Eggleton et al. | 385/37 |
| 6,917,735 | B2 * | 7/2005 | Murgatroyd et al. | 385/37 |
| 7,257,877 | B2 * | 8/2007 | Hanaoka et al. | 29/557 |
| 7,457,496 | B2 * | 11/2008 | Joyner | 385/37 |
| 2007/0014017 | A1 * | 1/2007 | Thome-Forster et al. | 359/569 |
| 2008/0003528 | A1 * | 1/2008 | Gaylord et al. | 430/322 |

(Continued)

OTHER PUBLICATIONS

"Pitch and Size Reduction Lithography", Sunghoon Kwon et al., Molecular Foundry Research Highlight, LBNL Materials Sciences Division, 2007.*

(Continued)

*Primary Examiner* — Frank Font
(74) *Attorney, Agent, or Firm* — David S. Alavi

(57) ABSTRACT

An optical apparatus comprises at least one primary diffraction grating and at least one reference diffraction grating each formed on or within a common grating substrate. The reference diffraction grating is arranged so as to diffract and disperse spatially according to wavelength a reference optical signal incident on the reference diffraction grating at an input incidence angle. The primary diffraction grating is arranged so as to diffract and disperse spatially according to wavelength an input optical signal incident on the primary diffraction grating at the input incidence angle. The reference and primary diffraction gratings exhibit at least one differing grating structural parameter. The reference and primary diffraction gratings are arranged so that a diffracted and spatially dispersed reference optical signal having at least one known wavelength component defines at least one spatial wavelength calibration reference for the diffracted and spatially dispersed input optical signal.

47 Claims, 13 Drawing Sheets

U.S. PATENT DOCUMENTS

2008/0018874 A1* 1/2008 Dusa et al. .................. 355/55
2008/0030857 A1* 2/2008 Ohnishi et al. ............. 359/569
2011/0035171 A1* 2/2011 Ziger .......................... 702/85

OTHER PUBLICATIONS

Application Note entitled "Monolithic Diffraction Grating Arrays enable Wide-Bandwidth Single-Shot and Self-Calibrated Spectrometers" by Christoph M. Greiner, Dmitri Iazikov, and Thomas W. Mossberg; published prior to Sep. 6, 2007 by LightSmyth Technologies Inc.

Application Note entitled "Gratings with Integral Calibration Features" published prior to Sep. 6, 2007 by LightSmyth Technologies Inc.

Application Note entitled "Application Note: Monolithic Silicon Grating Arrays" published Apr. 10, 2007 by LightSmyth Technologies Inc.

* cited by examiner

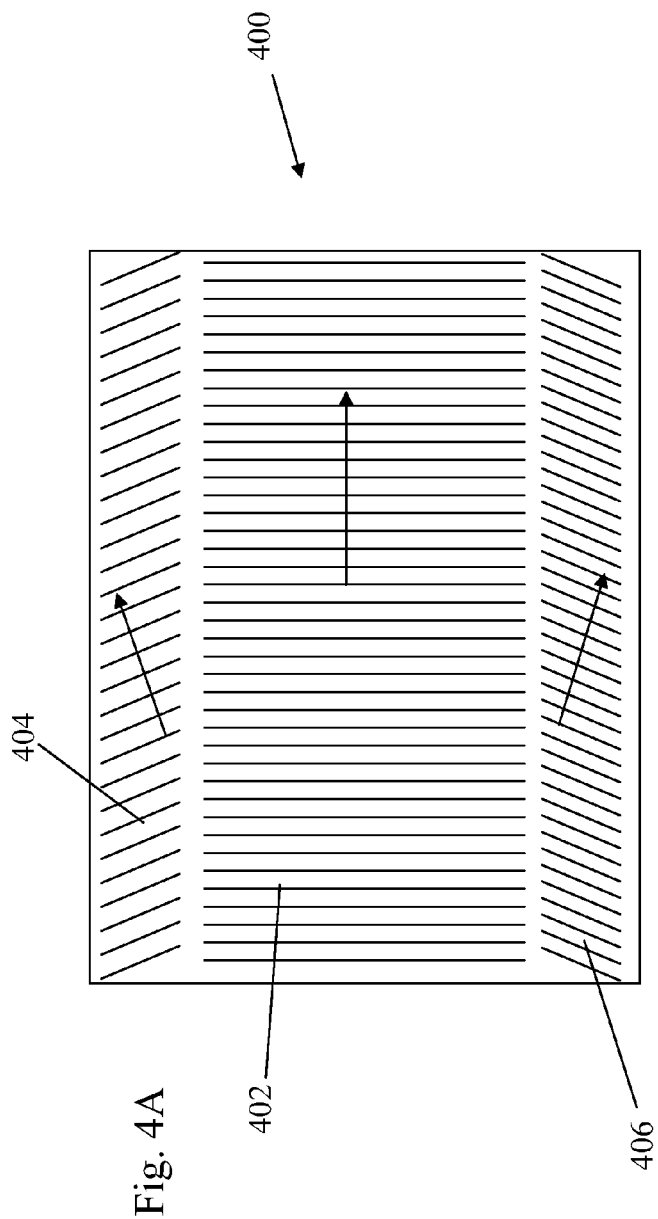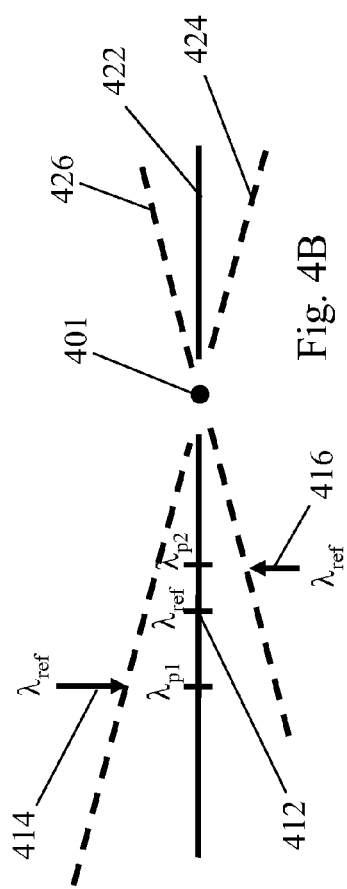
Fig. 4A
Fig. 4B

MONOLITHIC ARRAYS OF DIFFRACTION GRATINGS

BENEFIT CLAIMS TO RELATED APPLICATIONS

This application claims benefit of U.S. provisional App. No. 60/842,793 entitled "Advanced grating elements" filed Sep. 6, 2006 and U.S. provisional App. No. 60/921,561 entitled "Monolithic grating arrays with calibration features" filed Apr. 3, 2007, both of said provisional applications being hereby incorporated by reference as if fully set forth herein.

BACKGROUND

The field of the present invention relates to diffraction gratings. In particular, monolithic surface diffraction gratings are disclosed herein that include integrated calibration features.

Diffraction gratings have long been used to disperse light into its spectral components for scientific analysis or for other reasons. Traditional surface gratings (reflective or transmissive) comprise closely spaced sets of grating lines or diffractive elements that are typically created either by a mechanical ruling engine or by recording an optical interference pattern via exposure of a photosensitive material. The mechanical and interferometric patterning methods have drawbacks in that only limited variation in the spacing, curvature, and other properties of the diffractive contours is practically achievable. Recently, the resolution of Deep Ultraviolet (DUV) photolithographic patterning tools has reached and exceeded the values needed to make diffraction gratings useful in the visible and near-infrared portions of the electromagnetic spectrum. Owing to the nature of the photolithographic patterning process, practical constraints are eliminated or relaxed for diffractive element geometry (e.g., structural parameters such as cross-sectional shape, contour shape, contour spacing, and so on) and other properties. The diffractions gratings disclosed herein employ design considerations that are readily implemented with photolithographic patterning and that include creating multiple diffraction gratings on single grating substrates. The multiple diffraction gratings thus formed can provide convenient calibration of output spectra and simultaneous viewing of adjacent spectral regions so as to span wide bandwidths at high resolution.

Various embodiments, implementations, and adaptations of diffractive elements of waveguide gratings or surface gratings (reflective or transmissive) are disclosed in:

application Ser. No. 11/685,212 filed Mar. 13, 2007 (now U.S. Pat. No. 7,286,732);
application Ser. No. 11/532,532 filed Sep. 17, 2006 (now U.S. Pat. No. 7,190,859);
application Ser. No. 11/531,274 filed Sep. 12, 2006 (now U.S. Pat. No. 7,519,248);
application Ser. No. 11/423,856 filed Jun. 13, 2006 (now U.S. Pat. No. 7,224,867);
application Ser. No. 11/376,714 filed Mar. 14, 2006 (now U.S. Pat. No. 7,349,599);
application Ser. No. 11/298,290 filed Dec. 9, 2005 (now U.S. Pat. No. 7,330,614);
application Ser. No. 11/280,876 filed Nov. 15, 2005 (now U.S. Pat. No. 7,773,842);
application Ser. No. 11/076,251 filed Mar. 8, 2005 (now U.S. Pat. No. 7,062,128);
application Ser. No. 11/055,559 filed Feb. 9, 2005 (now U.S. Pat. No. 7,123,794);
application Ser. No. 10/998,185 filed Nov. 26, 2004 (now U.S. Pat. No. 6,993,223);
application Ser. No. 10/989,236 filed Nov. 15, 2004 (now U.S. Pat. No. 6,965,716);
application Ser. No. 10/653,876 filed Sep. 2, 2003 (now U.S. Pat. No. 6,829,417);
application Ser. No. 10/602,327 filed Jun. 23, 2003 (now U.S. Pat. No. 6,859,318);
application Ser. No. 10/229,444 filed Aug. 27, 2002 (now U.S. Pat. No. 6,678,429);
application Ser. No. 09/811,081 filed Mar. 16, 2001 (now U.S. Pat. No. 6,879,441).

Application Ser. No. 11/531,274 and application Ser. No. 11/376,714 are hereby incorporated by reference as if fully set forth herein. Those applications and the other applications listed are indicative of the state of the art available for forming diffractive elements, and may be applicable to formation of diffractive elements for monolithic arrays of diffraction gratings according to the present disclosure.

A simple example of a diffraction grating 100 is shown in FIG. 1A. The example grating comprises a flat surface (i.e., a grating substrate, assumed to lie in the xy-plane) having a complex surface reflectivity (i.e., reflectivity characterized by amplitude and phase) that varies spatially, typically periodically. A reflection grating is considered in this example, but the general treatment applies to the complex transmissivity of a transmission grating as well. The surface-normal vector is n (assumed parallel to the z-axis). A flat grating is considered in this example, but more generally the grating surface can be curved and then the surface-normal vector would be position-dependent and defined relative to a plane locally tangent to the grating surface. The grating complex reflectivity can vary in amplitude, phase, or both as a function of position on the grating surface. As shown in the simple grating schematically depicted in FIG. 1A, reflectivity varies only along the x-axis. The spatial variation of reflectivity arises from diffractive elements 101 formed on or within the grating substrate. Such diffractive elements can take myriad forms. Typical examples include, but are not limited to: grooves or ribs formed on the grating surface, in or on a material layer on the grating substrate, or at a material interface within the grating substrate; or refractive index variations in the grating substrate material or in a material layer deposited thereon.

A region of constant reflectivity is defined as a diffractive contour, and the diffractive elements can be said to follow such contours or to be defined with respect to such contours. In the example grating of FIG. 1A the diffractive contours are simply straight lines parallel to the y-axis. The orientation of the grating surface and diffractive contours in FIG. 1A are chosen for expositional convenience only. Straight diffractive contours are considered in this example, but more generally can follow curvilinear paths. The corresponding diffractive elements can be continuous (as in the example of FIG. 1A) or they can be segmented or otherwise only partially fill the corresponding contour to enable control of effective diffractive element reflectivity, provide for the overlay of multiple grating structures, or for other reasons (as described in some of the references listed or incorporated above). Similarly, the positions of small subsets of diffractive elements can be configured so as to control the net diffracted field from each subset (as described in some of the references listed or incorporated above).

The grating possesses a wavevector $K_g$ which lies in the grating plane (i.e., the xy-plane in this example) and is oriented normal to the diffractive contours. The magnitude of $K_g$ is 1/a, where a is the spacing between contours measured along a mutual normal direction. For the example grating of FIG. 1A having uniformly spaced straight diffractive contours, the grating wavevector $K_g$ is constant. More generally, e.g., for gratings having curved or variably spaced contours, the grating wavevector $K_g$ can be defined only locally over small regions where contour spacing and orientation are relatively constant. Alternatively, a grating may be described in terms of a spatial Fourier transform which provides a decomposition of the structure in terms of multiple wavevectors.

Monochromatic input light (wavelength $\lambda$) incident on the grating possesses a wavevector $k_{in}$ oriented normal to its wavefront, i.e., $k_{in}$ is parallel to the ray representing the input light. In cases where the input light has a spatially varying wavefront, its wavevectors can be defined locally. The wavevector $k_{in}$ has the magnitude $1/\lambda$. When the input light has a range of spectral components, wavevectors of a corresponding range of magnitudes represent the various spectral components.

In the simple case where $K_g$, $k_{in}$, and n lie in a common plane (i.e., when $K_g$ lies in the plane of incidence defined by $k_{in}$ and n), the diffraction geometry illustrated in FIG. 1B results wherein the grating properties (the spacing a), input and output directions ($\theta_{in}$ and $\theta_{out}$), and wavelength ($\lambda$) are related according to the equation:

$$m\lambda = a \sin\theta_{in} - a \sin\theta_{out} \quad \text{Eq. 1}$$

where m is any integer including zero that provides real solutions for the output angle (defined as positive when on the opposite side of the normal relative to the input angle). Since Eq. 1 includes the wavelength $\lambda$ of the incident light for $m \neq 0$, the output angle will vary with input wavelength (i.e., the grating exhibits angular wavelength dispersion).

In more general cases, including those case wherein the grating wavevector does not lie in the plane of incidence defined by $k_{in}$ and n, the output wavevector may be determined by decomposing the input wavevector into two parts, one parallel to the plane of the grating and one perpendicular to it. These components are denoted $\vec{k}_{in}^{\,p}$ and $k_{in}^{\,z}$, respectively. Analogous components for the output wavevector are $\vec{k}_{out}^{\,p}$ and $k_{out}^{\,z}$. The allowed values of these quantities are given by:

$$\vec{k}_{out}^{\,p} = \vec{k}_{in}^{\,p} + m\vec{K}_g \quad \text{Eq. 2a}$$

$$k_{out}^{\,z} = \sqrt{(k_{in}^{\,2} - k_{out}^{\,p\,2})} \quad \text{Eq. 2b}$$

where m is any integer (including zero) that results in a real value for of $k_{out}^z$. Eqs. 2a and 2b indicate that a single input beam generates one or more output beams and except for the beam corresponding to m=0, the output directions are wavelength dependent. The m=0 beam is the specular reflection expected if the grating were a smooth surface without diffractive elements. The number of output beams is determined by the magnitude and orientation of $K_g$ relative to $k_{in}^p$.

An exemplary implementation of a reflective diffraction grating is shown in FIG. 2A, which shows the geometry of the grating 200, input beam 202, and various output beams 204. The grating surface defines the xy-plane, while the plane of incidence defines the xz-plane. The output beams 204 include the specular reflection (m=0) having a direction in the xz-plane determined by the standard law of reflection. Non-zero diffracted output orders (i.e., beams for which $m \neq 0$) are also found in the xz-plane, where light of various wavelengths is directed in directions consistent with Eq. 1.

When viewed in the far-field, the grating output typically assumes the general form shown in FIG. 2B when the input includes a broad spectrum of wavelengths. There is a central spot 210 representing the specular reflection and stripes 212 representing dispersed non-zero diffractive orders ($m = \pm 1$) on either side of the specular reflection. Generally, shorter wavelength components of the output beams are closer to the specular reflection. Additional higher orders ($|m| > 1$) may also appear depending on the wavelength range of interest and the spacing between grating lines.

In the arrangement of FIGS. 2A and 2B, a reference quasi-monochromatic light source (e.g., a laser based on atomic transitions, a spectral lamp, or other source of known narrow spectral output) incident on the grating will produce distinct spots in the bands of diffracted light 212. Such single output beams provide a single absolute calibration reference for the dispersed, diffracted output. At least two absolute calibration references would be required to determine absolute placement and absolute spatial dispersion of the diffracted, dispersed output. This can be accomplished by a reference optical signal having two or more quasi-monochromatic wavelength components, for example.

SUMMARY

An optical apparatus comprises: a first diffraction grating formed on or within a grating substrate and comprising a first set of diffractive elements; and a second diffraction grating formed on or within the same grating substrate as the first diffraction grating and comprising a second set of diffractive elements. The first diffraction grating is arranged so as to diffract and disperse spatially according to wavelength a first optical signal incident on the first diffraction grating at an input incidence angle. The second diffraction grating is arranged so as to diffract and disperse spatially according to wavelength a second optical signal incident on the second diffraction grating at the input incidence angle. The first and second diffraction gratings exhibit at least one differing grating structural parameter.

Objects and advantages of the present invention may become apparent upon referring to the exemplary embodiments illustrated in the drawings and disclosed in the following written description and/or claims.

BRIEF DESCRIPTION OF THE DRAWINGS

FIGS. 4A and 4B illustrate schematically an exemplary monolithic grating array and optical signals diffracted by the grating array.

The embodiments shown in the Figures are exemplary, and should not be construed as limiting the scope of the present disclosure and/or appended claims. It should be noted that the diffraction gratings are depicted schematically, and are shown with relatively few grating lines. An actual grating would typically have far more numerous grating lines much more densely spaced than those shown in the Figures.

DETAILED DESCRIPTION OF EMBODIMENTS

Examples of diffraction gratings disclosed herein are disclosed in the following application notes published by LightSmyth Technologies Inc., each of which is hereby incorporated by reference as if fully set forth herein. The application notes are cited in the accompanying Information Disclosure Statement. The incorporated application notes are: (i) "Monolithic Diffraction Grating Arrays enable Wide-Bandwidth Single-Shot and Self-Calibrated Spectrometers" by Christoph M. Greiner, Dmitri Iazikov, and Thomas W. Mossberg and published prior to Sep. 6, 2007; (ii) "Gratings with Integral Calibration Features" published prior to Sep. 6, 2007; and (iii) "Application Note: Monolithic Silicon Grating Arrays" published Apr. 10, 2007.

Figures 1A, 1B:
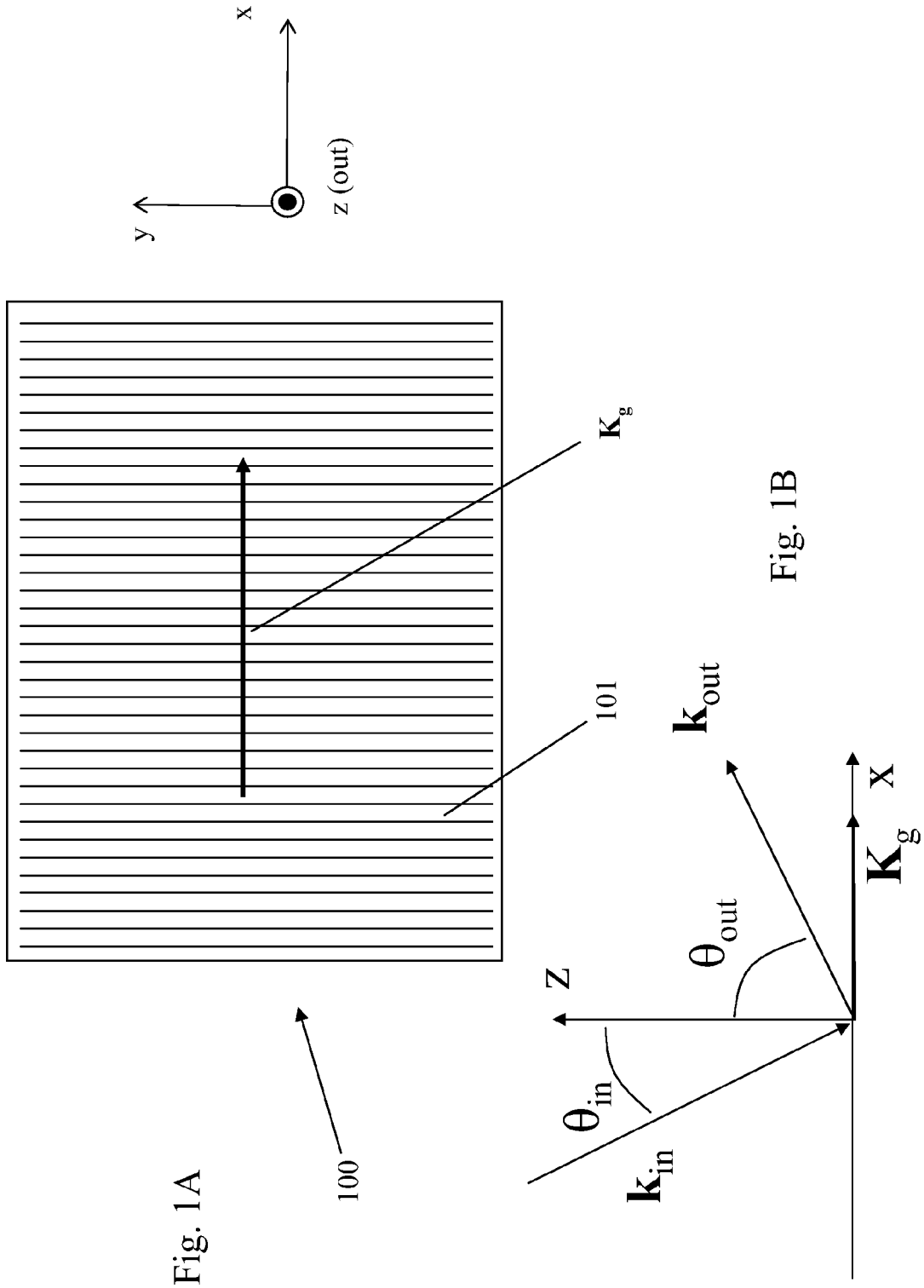
FIGS. 1A and 1B illustrate schematically an exemplary diffraction grating and optical signals diffracted by the diffraction grating.
Figure 2A:
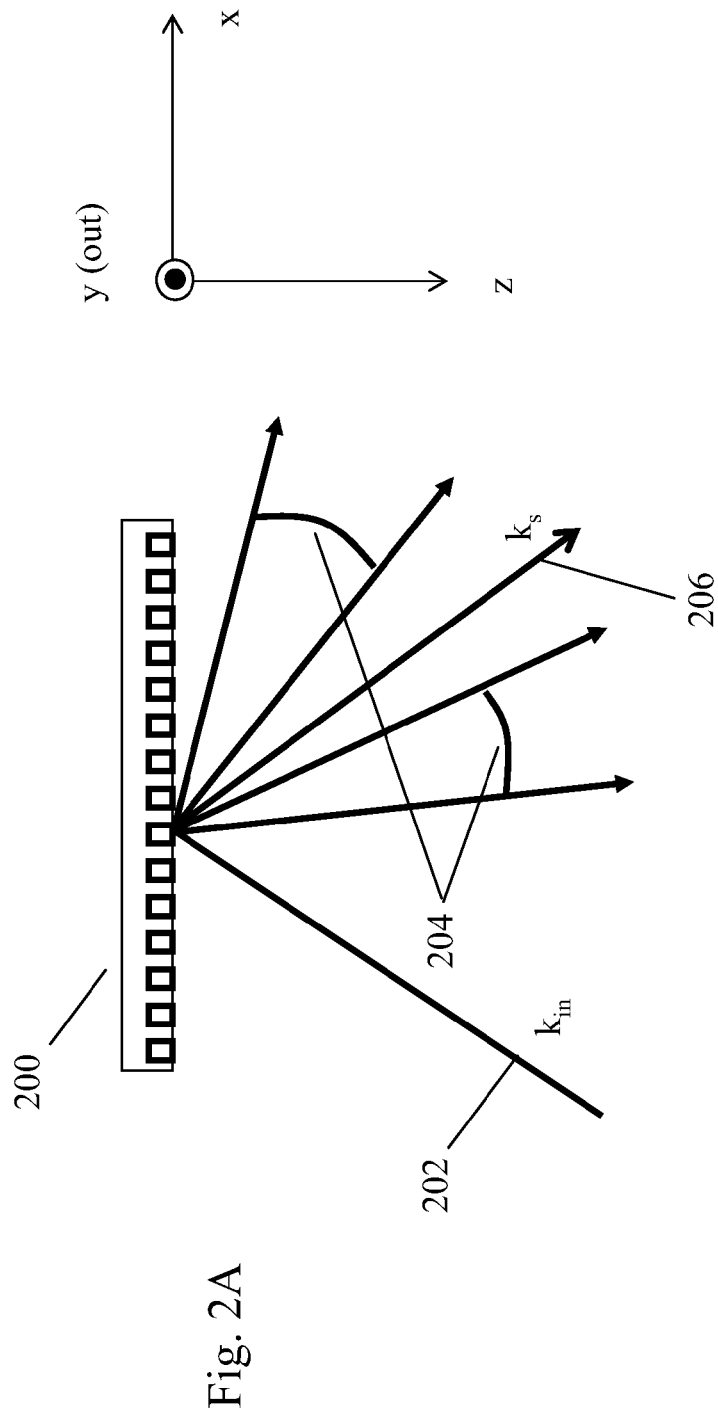
FIGS. 2A and 2B illustrate schematically an exemplary diffraction grating and optical signals diffracted by the diffraction grating.
Figure 2B:
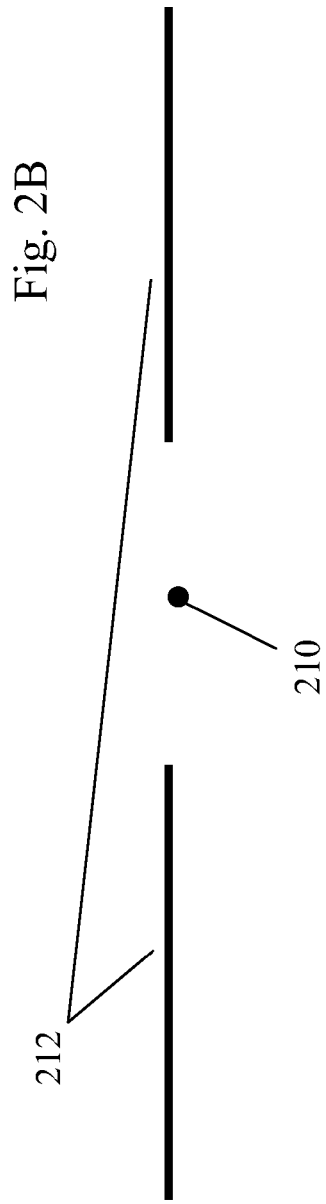
Figure 3A:
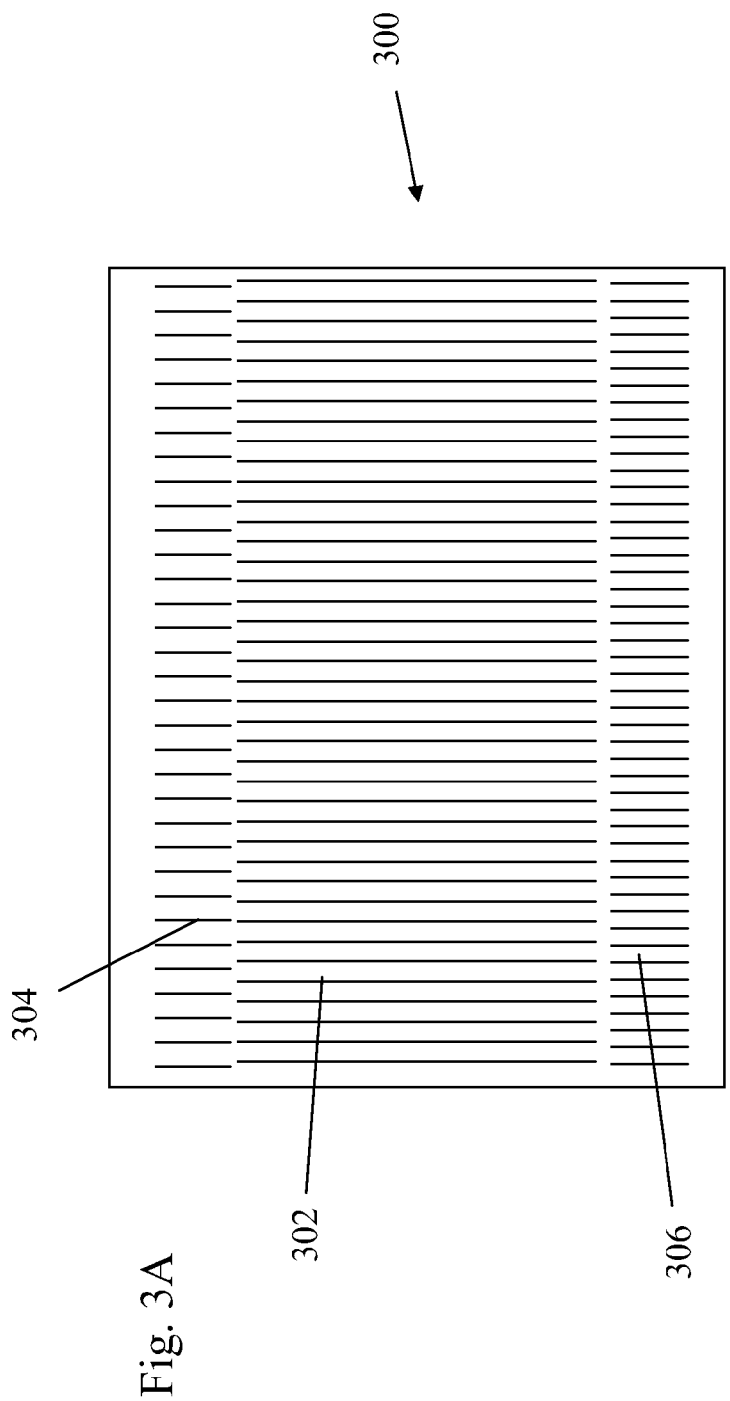
FIGS. 3A and 3B illustrate schematically an exemplary monolithic grating array and optical signals diffracted by the grating array.

An exemplary monolithic diffraction grating array is shown in FIG. 3A. The grating array 300 comprises a single grating substrate supporting three separate gratings 302, 304, and 306. In the example FIG. 3A, all of the grating lines (i.e., diffractive elements) are parallel, but the line spacing of the three gratings is different. The three diffraction gratings in this exemplary embodiment are a primary diffraction grating 302 and reference diffraction gratings 304 and 306 (also referred to as calibration gratings), with the primary grating 302 occupying the largest surface area of grating 300. Fabrication of such a monolithic grating array using traditional ruling or holographic fabrication techniques would be problematic (although possible), but it can be readily produced by, e.g., deep-ultraviolet (DUV) photolithographic patterning tools and processes. Typically such processing involves the steps of analytic design, rendition of the analytic design onto a reticle or mask using any suitable technique (e.g., laser writing or e-beam writing), projection of the mask pattern via a DUV stepper or scanner onto a photoresist covered wafer, development of the photoresist, and etching the surface to create the diffractive elements according to the analytic design. Typically the DUV photoprojection involves a reduction factor (typically 4, but may vary among DUV patterning tools), allowing the mask to be written on a larger scale than the final grating array. Once the grating array has been formed, it can be used as a master and reproduced via stamping, injection molding, nanoimprint lithography, or any suitable replication method. Many alternative lithographic fabrication tools or processes can be employed, such as mask aligners, i-line steppers, or other pattern transfer tools, provided they have sufficient spatial resolution to produce the grating of interest.

In describing the function of the grating array 300, the line spacings of reference gratings 304 and 306 and primary grating 302 are denoted as $a_1$, $a_2$, and b, respectively. A reference monochromatic light source of wavelength $\lambda_{ref}$ incident on the grating 300 at an incident angle $\theta_{in}$ produces an mth-order diffracted output beam from reference grating 302 according to $$m\lambda_{ref} = a_1 \sin\theta_{in} - a_1 \sin\theta^{(1)}{}_{out}$$

or alternatively $$m\lambda_{ref}/a_1 = (\sin\theta_{in} - \sin\theta^{(1)}{}_{out}), \quad \text{Eq. 3}$$

assuming the reference grating wavevector lies in the plane of incidence defined by the input beam. Similarly for the other reference grating 306 an mth-order diffracted output beam is produced according to $$m\lambda_{ref}/a_2 = (\sin\theta_{in} - \sin\theta^{(2)}{}_{out}), \quad \text{Eq. 4}$$

An input optical signal incident on the primary grating at angle $\theta_{in}$ will diffract at the angle $\theta^{(1)}{}_{out}$ light at wavelength $\lambda_{p1}$ in the nth diffraction order with $$n\lambda_{p1}/b = (\sin\theta_{in} - \sin\theta^{(1)}{}_{out}) = m\lambda_{ref}/a_1, \quad \text{Eq. 5}$$

and similarly that optical signal will diffract at the angle $\theta^{(2)}{}_{out}$ light at wavelength $\lambda_{p2}$ in the nth diffraction order with $$n\lambda_{p2}/b = (\sin\theta_{in} - \sin\theta^{(2)}{}_{out}) = m\lambda_{ref}/a_2. \quad \text{Eq. 6}$$

Figure 3B:
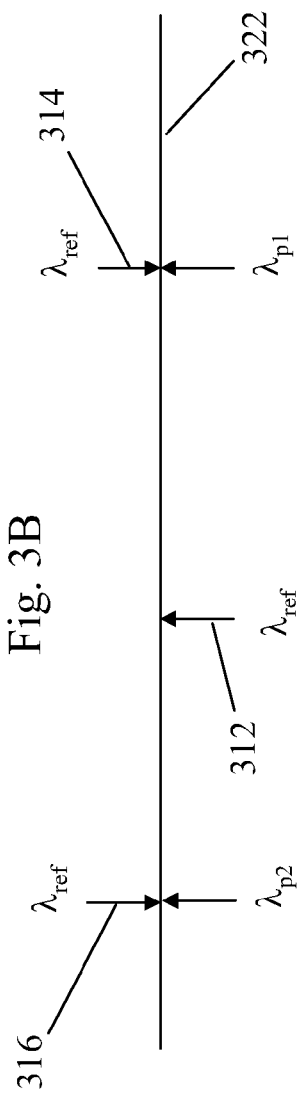

The relative positions of these diffracted beams is illustrated schematically in FIG. 3B. The reference optical signal with known wavelength $\lambda_{ref}$ diffracted from the reference grating 304 provides a spatial wavelength calibration reference for wavelength $\lambda_{p1}$ for the dispersed input signal. The reference optical signal with known wavelength $\lambda_{ref}$ diffracted from the reference grating 306 provides a spatial wavelength calibration reference for wavelength $\lambda_{p2}$ for the dispersed input signal. Together the two reference gratings 304 and 306 provide a spatial wavelength calibration scale, since subtracting Eqs. (5) and (6) results in $$\lambda_{p2} - \lambda_{p1} = bm(a_2 - a_1)\lambda_{ref}/(a_2 a_1 n). \quad \text{Eq. 7}$$

As illustrated schematically in FIG. 3B, the provision of a reference optical signal and a reference grating 304 or 306 in addition to the primary grating 302 provides a calibration reference 314 in the dispersed output of the primary grating for a first wavelength $\lambda_{p1}$. The calibration reference 314 is collocated with wavelength $\lambda_{p1}$ along the primary grating dispersion line 322 independent of the incident angle. Addition of a second reference grating provides a second such spatial wavelength calibration reference 316 collocated with wavelength $\lambda_{p2}$. With two reference gratings, the dispersed output of the primary grating contains (in the presence of the reference optical signal) two reference marks each corresponding to a corresponding output wavelength of the primary grating (independent of incident angle) and these marks delineate a spectral interval that is also independent of the incident angle. The various output signals discussed are schematically shown in FIG. 3B. The reference wavelength also interacts with the primary grating 302 to produce yet another calibration reference 312 spot in the primary grating output plane. It should be noted that a similar analysis can be performed for one or more grating wavevectors that are not parallel to the plane of incidence using equations analogous to Eqs. 2a and 2b.

The two calibration references produced by the reference gratings 304 and 306 can be used to calibrate the absolute wavelength of the entire dispersed spectrum of the primary grating 302. Additional reference gratings with various line spacings can be employed to provide as many calibration points in the output spectrum as might be needed or desired. It should be noted, however, that even a single reference grating can be used along with the primary grating to calibrate the primary grating output spectrum. A quasi-monochromatic reference optical signal, for example, produces output marks from both the reference grating and the primary grating. The spacing and position of these marks can be used to produce an equation similar to Eq. 7 and thereby provide for calibration of wavelength versus position for the output spectrum.

In an alternative embodiment (not shown), a single reference grating is employed that has two different diffractive orders (m and m+1) at the reference wavelength. Under these circumstances the second reference point is obtained at $$(m+1)\lambda_{ref}/a_1 = (\sin\theta_{in} - \sin\theta^{(2)}_{out}) \qquad \text{Eq. 8}$$

so that $$\lambda_{p2} - \lambda_{p1} = b\lambda_{ref}/(a_1 n). \qquad \text{Eq. 9}$$

Thus the output of the single reference grating, when exposed to the reference wavelength, creates two markers in the dispersed output of the primary grating (corresponding to the mth and (m+1)th order of the calibration grating). The markers correspond to input-angle independent output wavelengths of the primary grating and these marks delineate a spectral interval that is also input-angle independent.

In the grating array schematically illustrated in FIG. 3A all three gratings have overlapping output in the far field. Thus the output spectrum of the primary grating 302 will be contaminated by signals diffracting from the reference gratings 304 and 306. To eliminate cross-talk between the gratings, the reference gratings can be blocked, shuttered, or otherwise occluded during intervals when no reference optical signal is received, and in turn revealing or exposing the reference gratings when a reference optical signal is to be analyzed to calibrated the grating output. Alternatively, distribution of input light onto the grating array can be employed that provides for selective illumination or non-illumination of the reference gratings.

An alternative embodiment of grating array 400 is illustrated schematically in FIG. 4A. It will be noted that the lines of the reference gratings 404 and 406 gratings have a tilt relative to the orientation of the lines of the primary grating. Expressed differently, the respective grating wavevectors of the gratings 402, 404, and 406 are not parallel (grating wavevector directions indicated by arrows on the grating 400). The grating array 400 can be analyzed using Eqs. 2a and 2b. The far field output of such a grating array is shown schematically in FIG. 4B. The grating wavevector of the primary grating 402 is assumed to be parallel to the plane of incidence defined by the input and reference optical signals (i.e., grating lines perpendicular to the plane of incidence), but similar results are obtained if the primary grating wavevector is not parallel to the plane of incidence. The dashed lines 424 and 426 indicate the dispersed output spectra or dispersion lines of the two reference gratings 404 and 406, respectively. It should be noted that the tilt of the reference grating lines results in tilt of the far field output spectrum of the grating with the tilted lines. The light diffracted by the calibration gratings is therefore not superimposed on the light from the primary grating along dispersion line 422 (except at the specular reflection 401). The output spectra or equivalently the dispersion lines of the gratings intersect at the location 422 of the specular reflection which is common to all three gratings. Relatively small tilt angles result in calibration references 414 and 416 that remain relatively close to the dispersion line of the primary grating so that calibration references and dispersion lines can be conveniently placed, e.g., on a single two-dimensional detector array for optical-to-electrical conversion. On the other hand, the angular separation between the various dispersion lines should be at least a few times the diffractive spreading angle of monochromatic light diffracting from the gratings. For example, a grating whose length along the grating lines is approximately 0.5 mm in its narrowest direction would produce an output beam with approximately 1 mrad for mid-visible light. In such a case, the relative angular tilt between the grating lines should be at least several mrad or perhaps at least about 5 mrad.

Figure 5A:
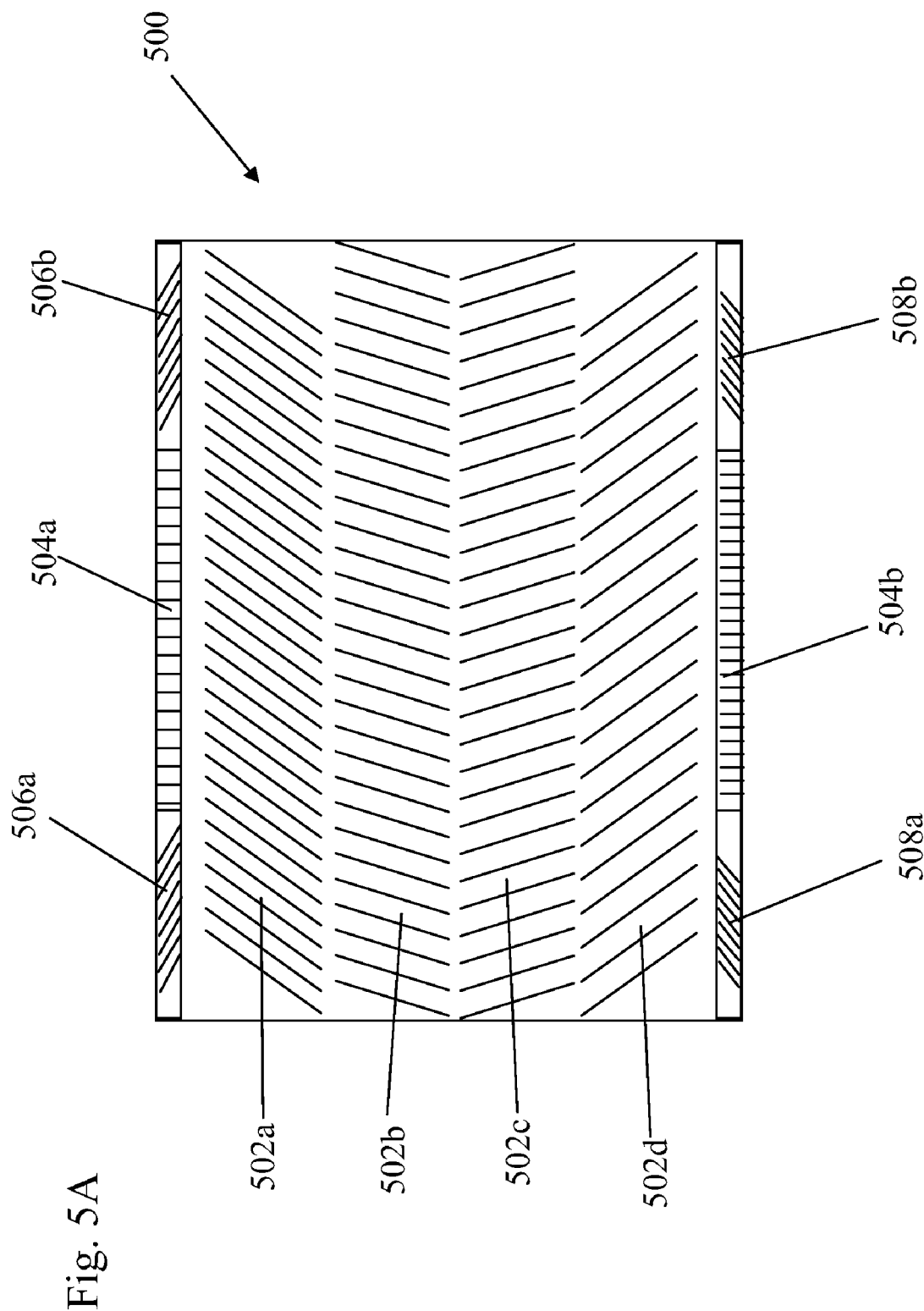
FIGS. 5A and 5B illustrate schematically an exemplary monolithic grating array and optical signals diffracted by the grating array.

The exemplary grating array 500 of FIG. 5A includes four primary gratings 502a/b/c/d (intended to provide measured spectra of an input optical signal) and six reference gratings 504a/b, 506a/b, and 508a/b. The grating line spacings and tilt angles shown schematically in FIG. 5A, while representative values are given in Table I. These are only examples and do not limit the scope of the present disclosure.

TABLE I

Exemplary Grating Properties

| Grating | relative contour tilt (degrees) | contour spacing (microns) |
| --- | --- | --- |
| 502a | 3 | 0.5591 |
| 502b | 1.5 | 0.7456 |
| 502c | −1.5 | 1.0019 |
| 502d | −3 | 1.3625 |
| 508a | 4.5 | 0.6782 |
| 504b | 0 | 0.6782 |
| 508b | 4.5 | 0.6782 |
| 506a | −4.5 | 0.9278 |
| 504a | 0 | 0.9278 |
| 506a | −4.5 | 0.9278 |

Figure 5B:
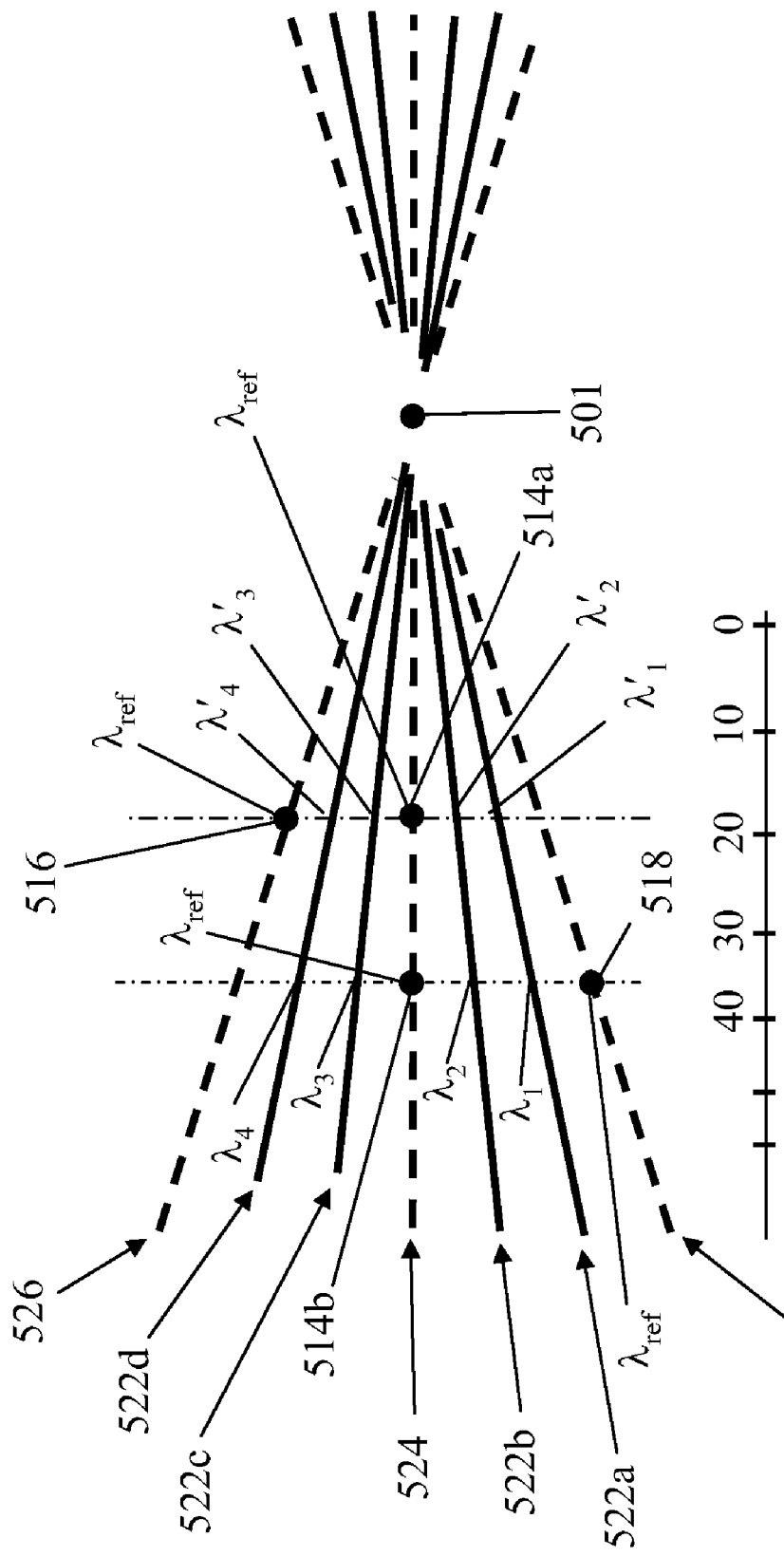

The far field output of the grating array of FIG. 5A is illustrated schematically in FIG. 5B for input light defining a plane of incidence perpendicular to the grating line of reference gratings 504a/b. The dashed lines 524, 526, and 528 represent the dispersion lines of the calibration gratings 504a/b, 506a/b, and 508a/b, respectively. The solid lines 522a/b/c/d represent the spectrally dispersed output of the four primary gratings 502a/b/c/d, respectively. The six reference gratings produce a total of four diffracted output markers 514a/b, 516, and 518 in response to a plane-wave reference optical signal. The reference gratings also produce a specular reflection 501. The marker outputs are shown as solid circles in FIG. 5B. The lower scale in the figure denotes the angular distance of various parts of the central dashed dispersion line 524 from the grating normal. The plot is calculated assuming an incidence angle of 20 degrees from the normal. The solid dot at right is the specular reflection output 501 for all of the gratings. Reference gratings 504a/b produce spatial wavelength calibration references 514a/b along the central dispersion line 524 which can be used to calibrate the spectral span of all of the primary grating outputs. As described earlier, the spectral width marked by the calibration references 514a/b is independent of the incidence angle for small tilt angles. As indicated in Eq. 7, use of different reference wavelengths enables different spectral intervals to be marked off by the reference gratings. As indicated in FIG. 5B, reference gratings 506a/b produce spots at the same location (in the far field) when the input light is a plane wave. If the input signal has a curved wavefront so that the angle of incidence is different at calibration gratings 506a/b, their respective output spots will not be superimposed. Therefore calibration gratings 506a/b not only provide a spectral calibration mark, but also provide an input wavefront curvature indication. Furthermore, overlap of spots from calibration gratings 506a/b provides a convenient method of locating the focal plane of an output lens. Calibration gratings 508a/b also produce superimposed marker spots for plane wave input and indicate input wavefront curvature should they appear separate. Note that calibration gratings 506a/b and 508a/b produce marks that are vertically displaced relative to the corresponding marks from reference gratings 504a/b for suitably small tilt angles. For larger tilt angles of the reference gratings 506a/b and 508a/b, the output marks rotate away from the vertical relative to the corresponding marks of gratings 504a/b. The location of these spots can be determined using Eqs. 2a and 2b.

The four primary gratings 502a/b/c/d are chosen to have contiguous and slightly overlapped spectral output ranges in the region between calibration grating marks. The spectral output ranges can be determined by Eq. 7 (see Table II) for small tilt or via Eqs. 2a and 2b more generally. By changing the reference wavelength, the beginning and end of the four continuous slightly overlapping spectral regions can be tuned. The grating array of FIG. 5A enables high resolution measurement over a wide spectral range and convenient calibration of the output using the marks produced by the reference gratings in response to input of a reference wavelength. One approach to utilizing the grating array includes placement of a 2-dimensional detector in the focal plane of an output lens. The output of the 2-dimensional detector can be electronically analyzed with the help of the calibration reference marks to conveniently map out wavelength versus detector position. The reference wavelength used to produce the calibration marks can be introduced only for calibration or can be present at all times so that each spectral measurement can be independently calibrated.

TABLE II

Wavelength ranges between calibration markers from primary gratings of FIG. 5A with 632.8 nm reference wavelength

| Primary Grating, n | Shorter wavelength $\lambda_n$ (μm) | Longer Wavelength $\lambda'_n$ (μm) |
| --- | --- | --- |
| 1 | 0.381 | 0.522 |
| 2 | 0.509 | 0.696 |
| 3 | 0.683 | 0.935 |
| 4 | 0.929 | 1.271 |

Figure 6A:
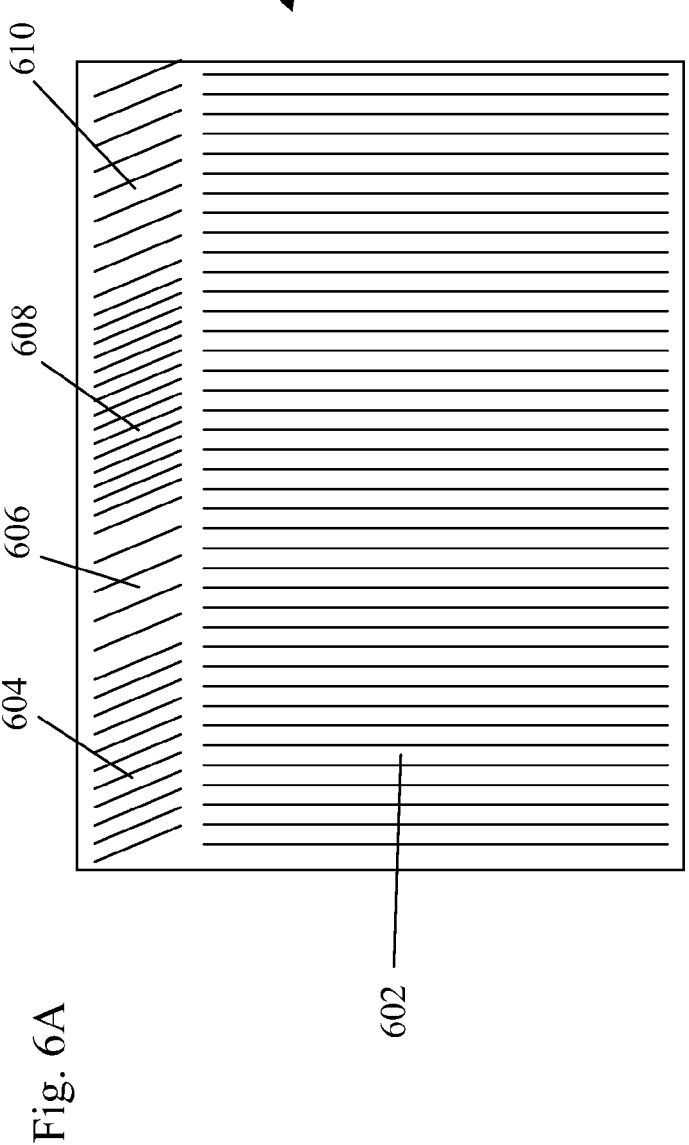
FIGS. 6A and 6B illustrate schematically an exemplary monolithic grating array and optical signals diffracted by the grating array.
Figure 6B:
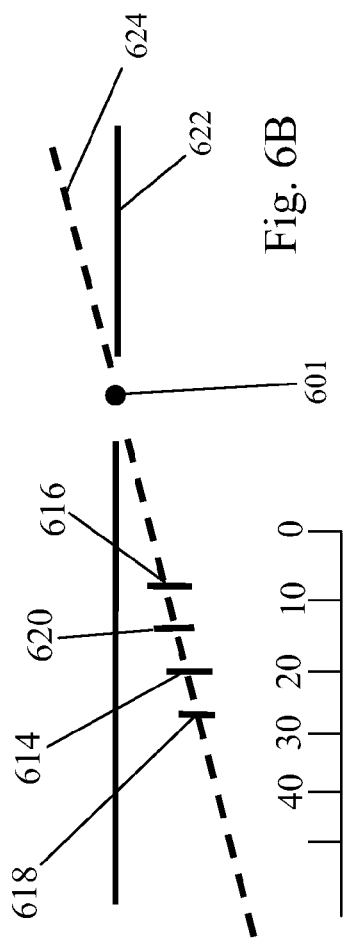

Reference gratings can be usefully employed even if there is only one primary grating, as in the exemplary embodiment illustrated schematically in FIG. 6A. The primary grating 602 a straight line grating of constant pitch (i.e., grating line spacing) having lines oriented in a traditional fashion parallel to two edges of the grating substrate 600. Four reference gratings 604/606/608/610 are arranged along a stripe perpendicular to the grating lines on one edge of the substrate. The lines of the reference gratings are not parallel to the primary grating lines, but in this example are parallel to each other. Different tilt angles for the various reference gratings could be alternatively employed. The five gratings of the grating array 600 have the exemplary line spacings given in Table III. The far field output of the grating array 600 is shown In FIG. 6B. The dashed line 630 is the spectrally dispersed output of the reference gratings 604/606/608/610. Four vertical lines 614/616/618/620 intersect the dashed dispersion line 630 at the location of reference markers produced by the indicated calibration gratings in response to 632.8 nm input reference light. The black line 622 represents the dispersed output of the primary grating 602. The solid dot at the intersection point of the dashed and solid lines is the specular reflection signal 601 of all gratings in the array. At the bottom of the figure, the angular distance of the primary grating output signals from the grating normal are shown (assuming a 20° angle if incidence and that the plane of incidence is perpendicular to the grating lines of primary grating 602; this need not be the case). The four reference gratings 604/606/608/610 produce a convenient series of markers whose positions relative to the primary grating's output spectrum 622 can be precisely determined using Eqs. 2a and 2b and for relatively small tilts approximately determined by Eq. 7. The predictable relative position of the calibration marks to the spectral components of the primary grating's output allows for complete and redundant calibration of the output plane in terms of wavelength versus position.

TABLE III grating line spacings for the gratings of FIG. 6A

| grating | grating spacing (μm) |
| --- | --- |
| 602 | 1.0000 |
| 604 | 0.9166 |
| 606 | 1.2500 |
| 608 | 0.7500 |
| 610 | 1.0830 |

Reference gratings can be used to provide a complete wavelength scale for immediate visual identification of signals coming from a primary grating simply by comparison to the wavelength markers. For example, reference gratings can be designed to create in response to a given reference wavelength calibration reference markers in the output plane for every integer multiple of 50 nm in the region of interest. An unknown, e.g., monochromatic, signal could then be approximately identified with respect to its wavelength by simple comparison to the closest marker. Such a set of reference gratings (or any desired set of reference gratings) can be designed employing methods of computer-generated holography and then fabricated via lithography as described above. Alternatively, the reference gratings could be produced by traditional holographic recording methods. However they are fabricated at the master level, the resulting grating array can be replicated at low cost via stamping, injection molding, or other techniques to produce low cost and convenient wavelength measurement apparatus.

In addition, a more complex diffractive structure can be that produces, in addition to the spatial wavelength calibration reference marks, also produces a label for one or more such reference marks. For example, a given wavelength reference mark can be identified by its own label. Since the output signal is typically viewed in the far filed (whether truly in the far field or at the focal plane of a lens), simple two-dimensional Fourier transform methods can be used to design a diffractive structure suitable for producing the desired wavelength label.

Figure 7:
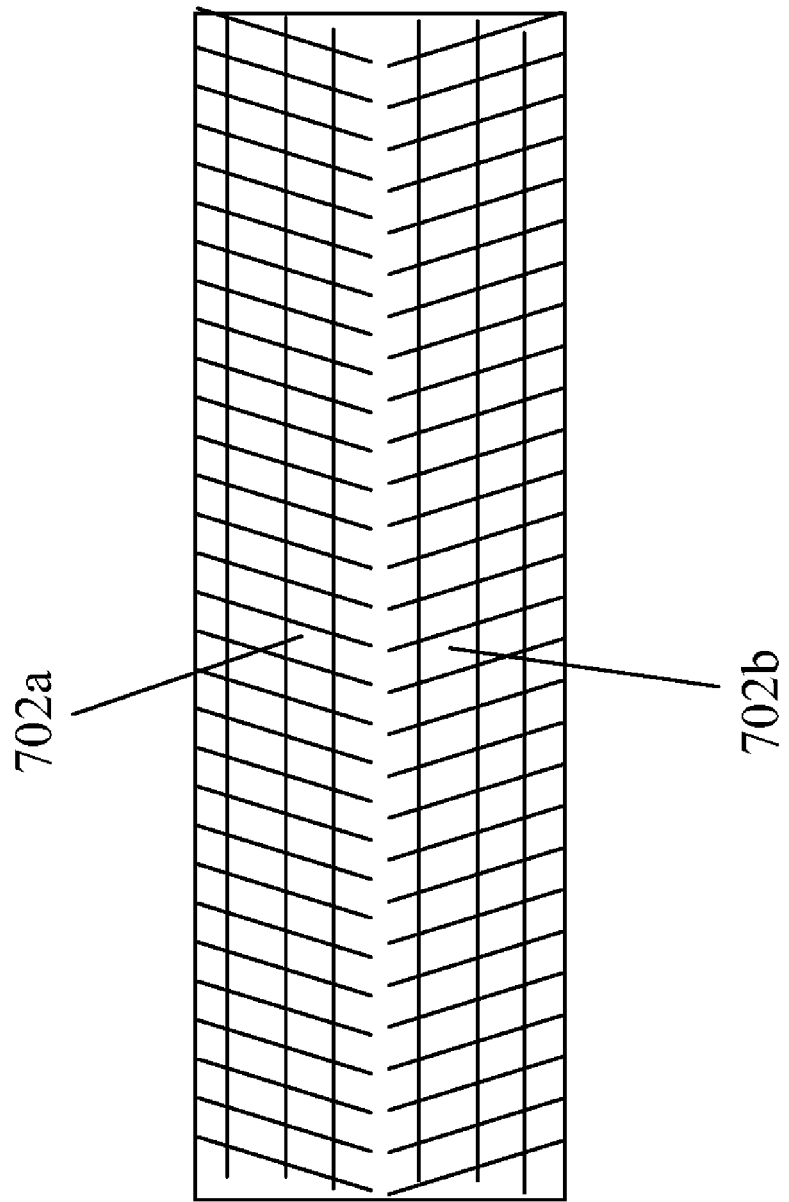
FIG. 7 illustrates schematically an exemplary monolithic grating array with crossed gratings.
Figure 8A:
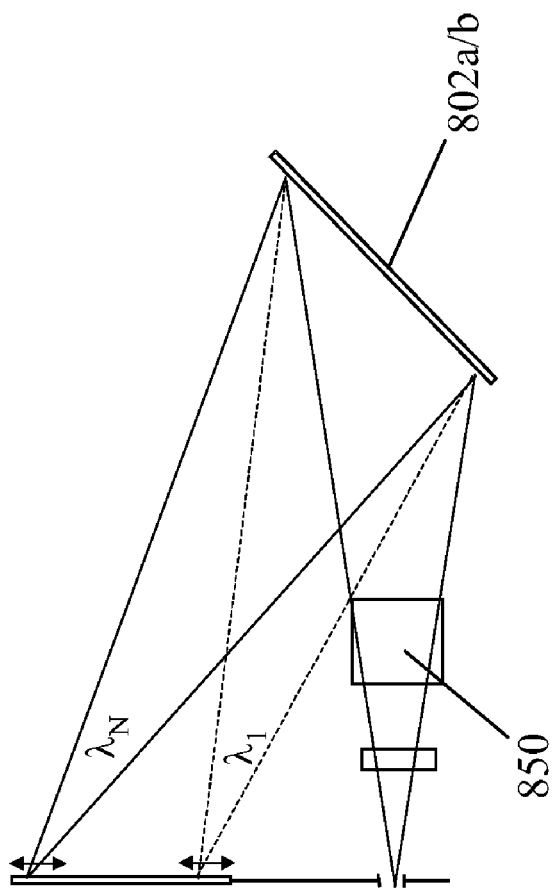
FIGS. 8A and 8B illustrate schematically an exemplary spectrometer with a monolithic grating array.
Figure 8B:
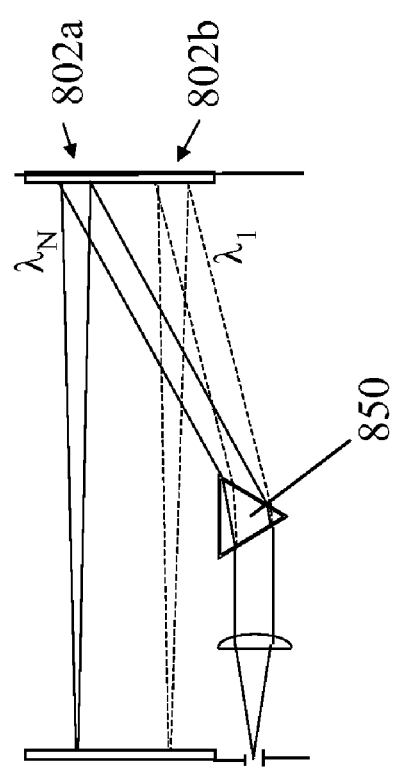

In using a grating array such as the example shown in FIG. 5A, each primary grating produces a certain first order diffracted output in the spatial region between the calibration marks. For the exemplary grating parameters of Table I, the range of first order wavelength produced is shown in Table II. The total operating range of the grating array, for a particular reference wavelength, is given by the shortest and longest wavelength signals output within the calibration marked region by any primary grating. In designing an instrument using such a grating array, which is specified as operative over the full contiguous wavelength of all the primary gratings, it would typically be assumed that light anywhere within the operating range can be input to the device and incident on all of the primary gratings. For this example and in other cases, it is found that the primary gratings with the larger line spacings produce a second order output in the marker delineated output spatial window that partially overlaps the first order spectral range of the shorter period gratings. Thus confusion can arise as to whether an output signal detected in the output of the larger-spaced primary gratings is a long wavelength signal in first order or instead a short wavelength signal in second order. This complication can be dealt with in a variety of ways. The shorter period gratings will also generate a signal if the longer period grating signal is really a short wavelength in second order. Comparison of the various grating signals can thus provide a way to eliminate this second order ambiguity. Alternatively, long-pass optical filters can be placed in the optical path of the longer period gratings prior to or after the grating array or directly on the longer period gratings to prevent second order signals from being detected. The filtering material can also be placed directly on the detector. Yet another alternative approach to distinguishing signals of various orders is illustrated schematically in FIG. 7, which shows the primary gratings 702a/b as cross gratings. Interaction of input signals with cross gratings will produce dispersion along both axes so that overlapped first and second order signals will be vertically displaced into vertical dispersion orders. The zero-order cross dispersion signal can be minimized by appropriate design of the horizontal grating, e.g., with approximately 50% duty cycle with a $\pi$ phase shift in the optical path between trench and mesa for a grating with rectangular grooves. Yet another method for dealing with second order ambiguity is illustrated schematically in FIGS. 8A and 8B, in which a prism 850 is employed to disperse the input optical signal across the primary gratings 802a/b. The arrangement of FIGS. 8A and 8B also provides the advantage of less signal loss arising from division of optical power over all of the primary gratings. Other arrangements for resolving second-order ambiguity can be employed and fall within the scope of the present disclosure or appended claims.

Figure 9:
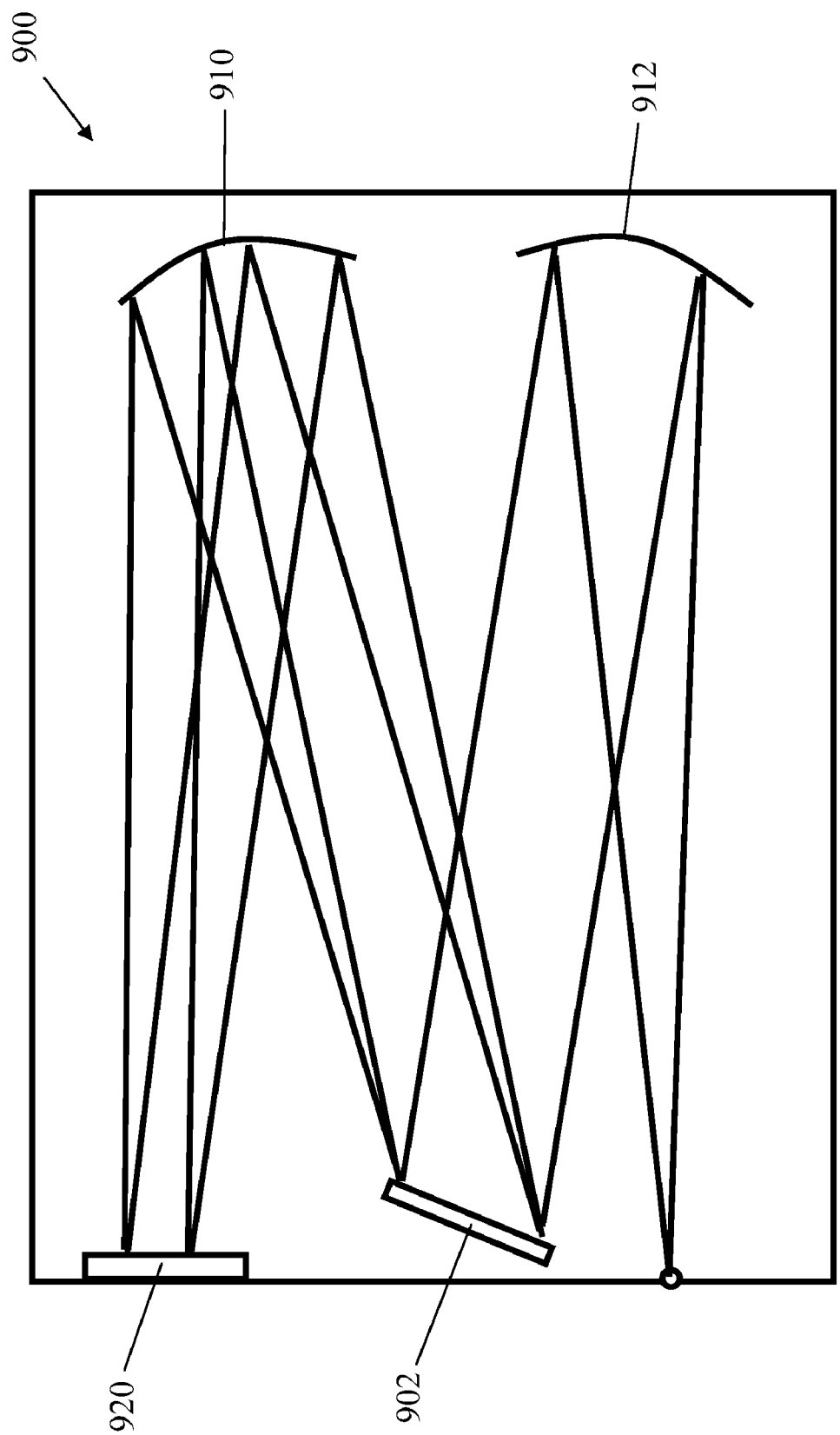
FIG. 9 illustrates schematically an exemplary spectrometer with a monolithic grating array.

The various primary and reference gratings disclosed herein need not occupy spatially distinct regions of the waveguide substrate. The gratings can be overlaid or interleaved according to techniques and arrangements disclosed in various of the listed or incorporated references A spectrometer 900 based on a grating array 902 arranged according to the present disclosure is illustrated schematically in FIG. 9. Except for the grating array 902 and detector 920, the spectrometer 900 resembles a standard Czerny-Turner spectrometer. The detector is a two-dimensional array, e.g., a CCD array or a CMOS array. Detectors such as these are now being mass produced for digital photography and their low cost availability promises high performance spectroscopic performance with overall low system cost. The grating array 902 has one or more primary gratings with a relative tilt and may have one or more reference gratings with another set of tilts. The 2D detector is calibrated via electronic analysis of signals produced by the grating array in response to input of a reference wavelength introduced via the input aperture or a dedicated input (not shown). Alternatively, the grating array may have no reference gratings but only two or more primary gratings of various relative tilts. The angularly separated dispersion lines seen by the detector can be calibrated by traditional means.

The gratings arrays according to the present disclosure can be employed in any type of grating-based spectrometer, including imaging spectrometer. For example, such a spectrometer can be used in conjunction with a two-dimensional detector array to gather spectral content of a image or object scanned across the entrance port of such a spectrometer. The gratings arrays according to the present disclosure can be employed in any type of spectroscopy. Examples include (but are not limited to) emission spectroscopy, fluorescence spectroscopy, laser-induced breakdown spectroscopy, absorption spectroscopy, Raman spectroscopy, light scattering spectroscopy, or an other type of spectroscopy wherein wavelength selectivity is needed or desired.

In the disclosed exemplary embodiments, the primary and reference gratings are shown having straight diffractive elements (i.e., grating lines) uniformly spaced. The various gratings in these examples differ from one another with respect to line spacing or line tilt, in order to achieve differing dispersion or spatial characteristics for the corresponding optical output. However, neither the present disclosure nor the appended claims are limited to such gratings. Gratings having diffractive elements that are straight or curvilinear or that are chirped or otherwise non-uniformly spaced can also be employed to form grating arrays according to the present disclosure. Such gratings can provide additional functionality, e.g., suitably curved and chirped diffractive elements can provide wavefront transformation in addition to providing wavelength dispersion. Such wavefront transformation can be employed for providing focusing, collimation, or conjugate imaging of the diffracted optical signals, potentially eliminating the need for separate focusing optics such as lenses or curved mirrors.

Figure 10:
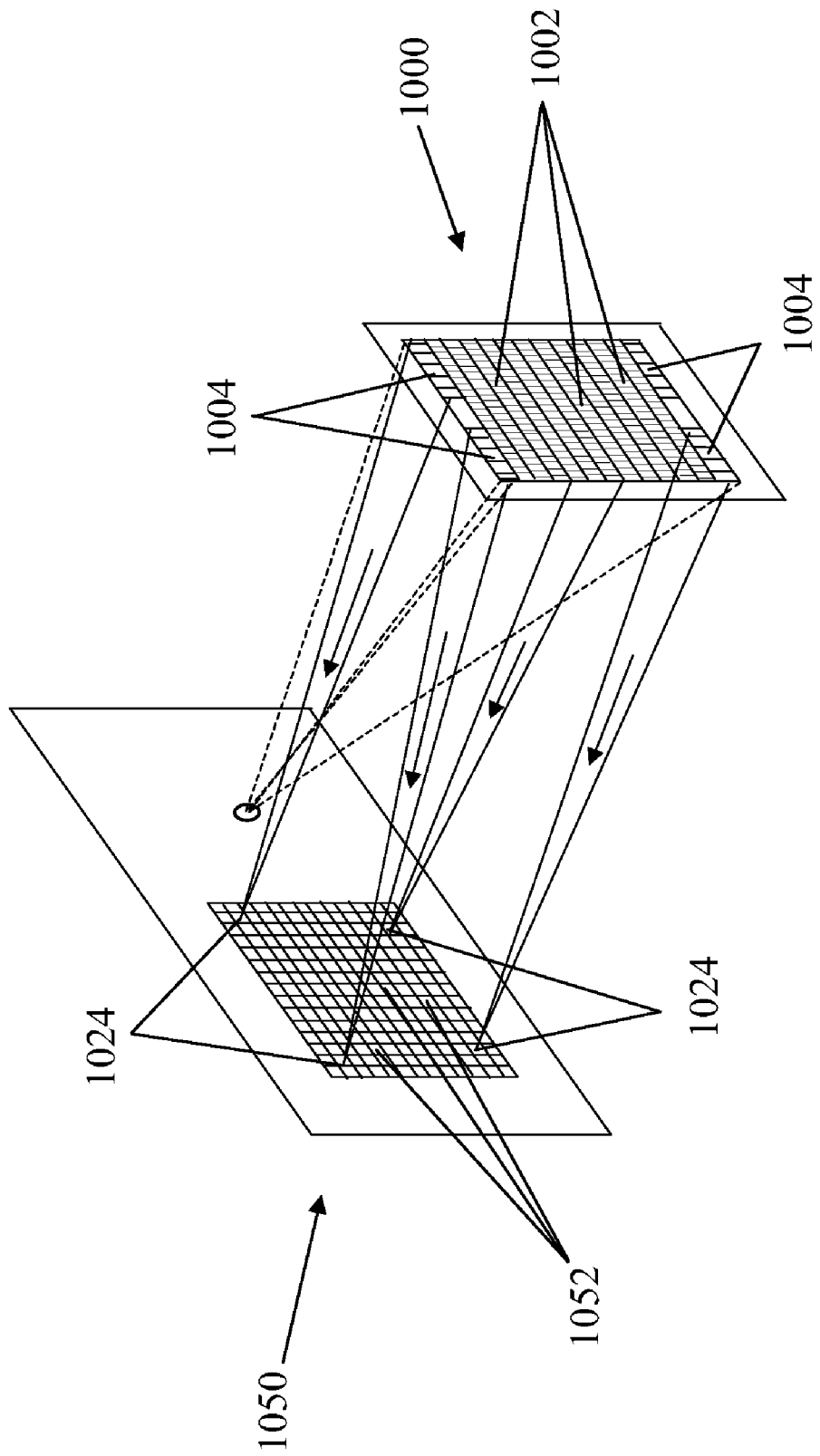
FIG. 10 illustrates schematically an exemplary spectrometer with a monolithic grating array.

In the exemplary embodiment illustrated schematically in FIG. 10, a grating array 1000 comprises multiple primary gratings 1002 and reference gratings 1004. Each grating is arranged to direct and image its corresponding diffracted optical signal to a corresponding distinct area 1052 of 2D detector array 1050. Electronic processing of the signals from detector array 1050 enables separate analysis of each diffracted optical signal relative to calibration reference marks 1024 provided by the reference gratings 1004.

Line spacing and line tilt are not the only grating structural parameters that can differ among the various primary and reference gratings to enable definition of a spatial wavelength reference for a dispersed optical signal. Any grating structural parameter or combination of parameters that characterize the diffractive elements can differ among the gratings for providing the required differences in dispersion or spatial characteristics among the respective diffracted optical signals to define the desired spatial wavelength calibration reference(s). Such grating structural parameters can include, but are not limited to, line tilt, line density or variations thereof (e.g., chirp), blaze, diffractive element curvature, diffractive element cross-sectional shape, modulation depth, duty cycle, overall grating area, overlay or interleave arrangement, and so on. Details of many of these are disclosed extensively in the listed or incorporated references.

Figures 11A, 11B:
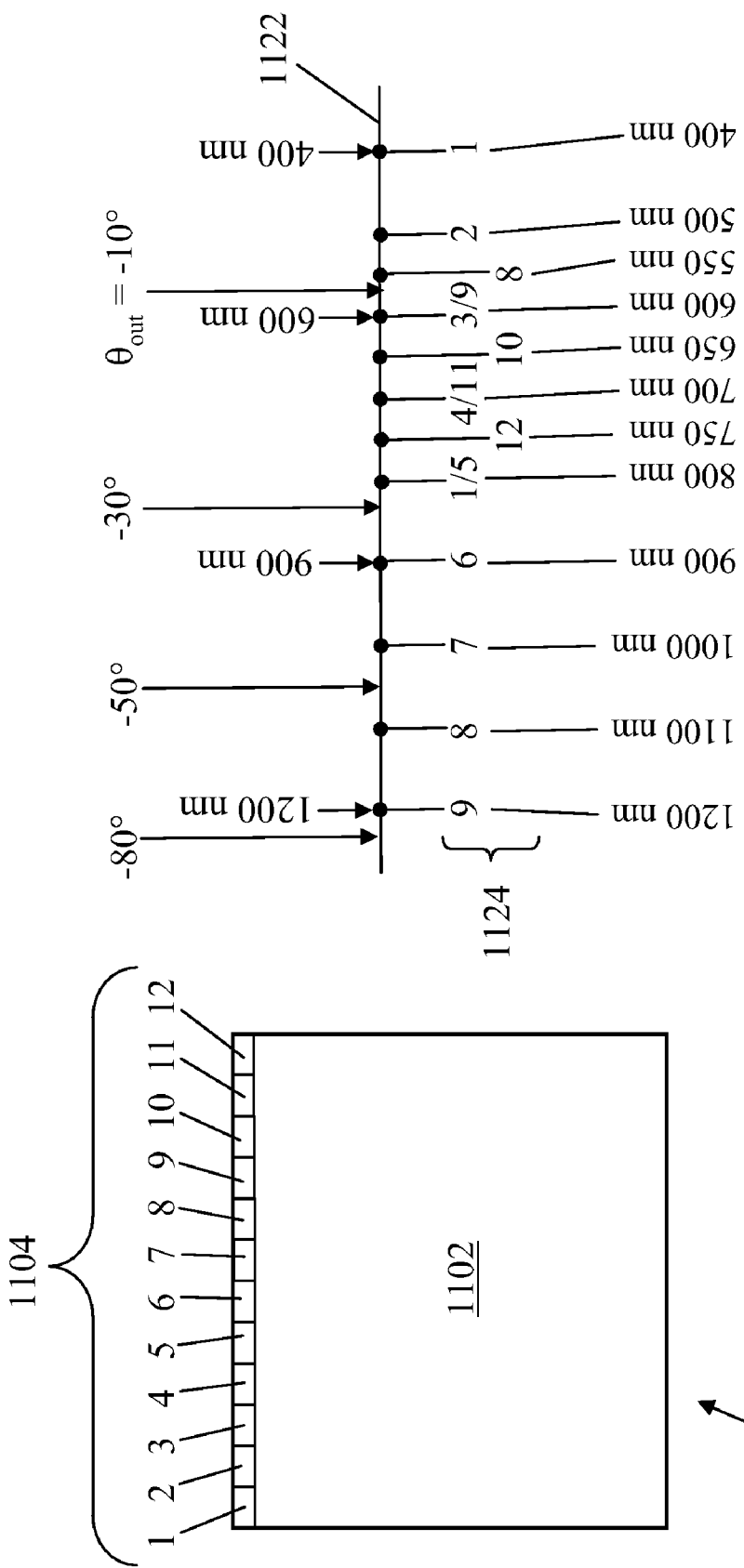
FIGS. 11A-11C illustrate schematically an exemplary monolithic grating array and optical signals diffracted by the grating array.

An exemplary embodiment of a diffraction grating 1100 is illustrated schematically in FIG. 11A and includes integral reference gratings 1104 provided for alignment and calibration using only a single reference wavelength. The primary grating 1102 is arranged to function in the traditional manner (i.e., it comprises straight, uniformly spaced lines perpendicular to the plane of incidence). The reference gratings 1104 comprise a row of much smaller gratings 1104-1 through 1104-12 (e.g., each about 0.5×2 mm). Each reference grating 1104 has its own grating period, and can also have its own tilt angle with respect to the primary grating lines. The reference gratings 1104 and primary grating 1102 are relatively positioned with interferometric accuracy, which can be readily achieved with photolithographic fabrication.

If the grating lines of the of the reference gratings 1104 are parallel to those of the primary grating 1102, then the output of the primary grating 1102 and all of the reference gratings 1104 fall along a single line 1122 in the detection plane (typically at the focal plane of a lens collecting the diffracted optical signals; FIG. 11B). The optical signals diffracted from the reference gratings 1104-1 through 1104-12 result in spatial wavelength calibration references 1124-1 through 1124-12, respectively. Such a grating can be used with single one- or two-dimensional photodetector array. When not in use for calibration or alignment, the reference gratings 1104 can be blocked, shuttered, or otherwise occluded to prevent optical signals diffracted by the reference grating array from interfering with spectra of interest. The grating pitches required to yield the positions of the calibration references shown in FIG. 11B can be determined using Eq. 5 or 6. A set of exemplary grating line spacings is given in the third column of Table IV that results in the arrangement of diffracted optical signals shown in FIG. 11B, which also assumes a 30° incidence angle and a reference wavelength of 632.8 nm (HeNe laser). The angles shown at the top of FIG. 11B indicate the propagation direction of diffracted signals relative to the grating normal, with minus (−) signs indicating that input and output are on the same side of the grating normal. Other reference wavelengths, gratings spacings, and incidence angles can be employed within the scope of the present disclosure or appended claims.

TABLE IV

| Grating | First-order Marker wavelength* (nm) | Lines/mm (non-tilted) | Lines/mm (tilted) | Tilt angle (deg) |
|---|---|---|---|---|
| 1102 | na | 1200 | 1200 | 0 |
| 1104-1 | 400 | 758.6 | 760.6 | 4.158 |
| 1104-2 | 500 | 948.2 | 949.8 | 3.329 |
| 1104-3 | 600 | 1137.7 | 1139.1 | 2.775 |
| 1104-4 | 700 | 1327.4 | 1328.6 | 2.379 |
| 1104-5 | 800 | 1517.2 | 1518.2 | 2.082 |
| 1104-6 | 900 | 1706.7 | 1707.6 | 1.851 |
| 1104-7 | 500 | 948.2 | 949.8 | 3.329 |
| 1104-8 | 550 | 1043.0 | 1044.4 | 3.025 |
| 1104-9 | 600 | 1137.7 | 1139.1 | 2.775 |
| 1104-10 | 650 | 1232.6 | 1233.9 | 2.560 |
| 1104-11 | 700 | 1327.4 | 1328.6 | 2.379 |
| 1104-12 | 750 | 1422.2 | 1423.3 | 2.219 |

*First-order marker wavelength is the wavelength of light diffracted from the primary grating which falls at the same output angle as the HeNe marker signal from the referenced alignment/calibration grating. Note that alignment/calibration gratings produce additional HeNe markers at higher orders and that the marker wavelength is simply multiplied by the order number.

The wavelength numbers above the horizontal line 1122 are given by Eq. 3 applied to primary grating 1102. The spatial wavelength calibration references 1124 are shown arranged along line 1122, and are produced by illuminating the grating 1100 with a HeNe laser incident at 30° from the grating normal. The calibration references 1124 occur at precisely determined intervals along the primary grating dispersion line 1122, enabling calibration of the photodetector array scale with a single reference wavelength over the entire spectral region covered by the grating and detector array. The wavelengths shown below the dispersion line indicate the wavelength that the primary grating 1102 diffracts to the location of the corresponding calibration marks 1124.

If two or more non-adjacent reference gratings have the same period (reference gratings 1104-1/5, 1104-3/9, and 1104-4/11 in the current example), their respective signals (1124-1/5, 1124-3/9, and 1124-4/11) will optimally overlap at the focal plane of the collection lens if the input optical signal has a uniform wavefront. Such overlapping reference signals can be used for properly aligning the input and reference signal sources, photodetector array, grating, and collecting lens; the appearance of two marker spots indicate misalignment. It should be noted that the calibration wavelengths shown below the dispersion line 1122 do not change as the incidence angle of the input signal changes. The calibration wavelengths are invariant unless the wavelength of the reference optical signal changes. For different incidence angles, the detection plane pattern changes, but each wavelength calibration reference 1124 remains correlated with the same diffracted output wavelength of the primary grating 1102.

Figure 11C:
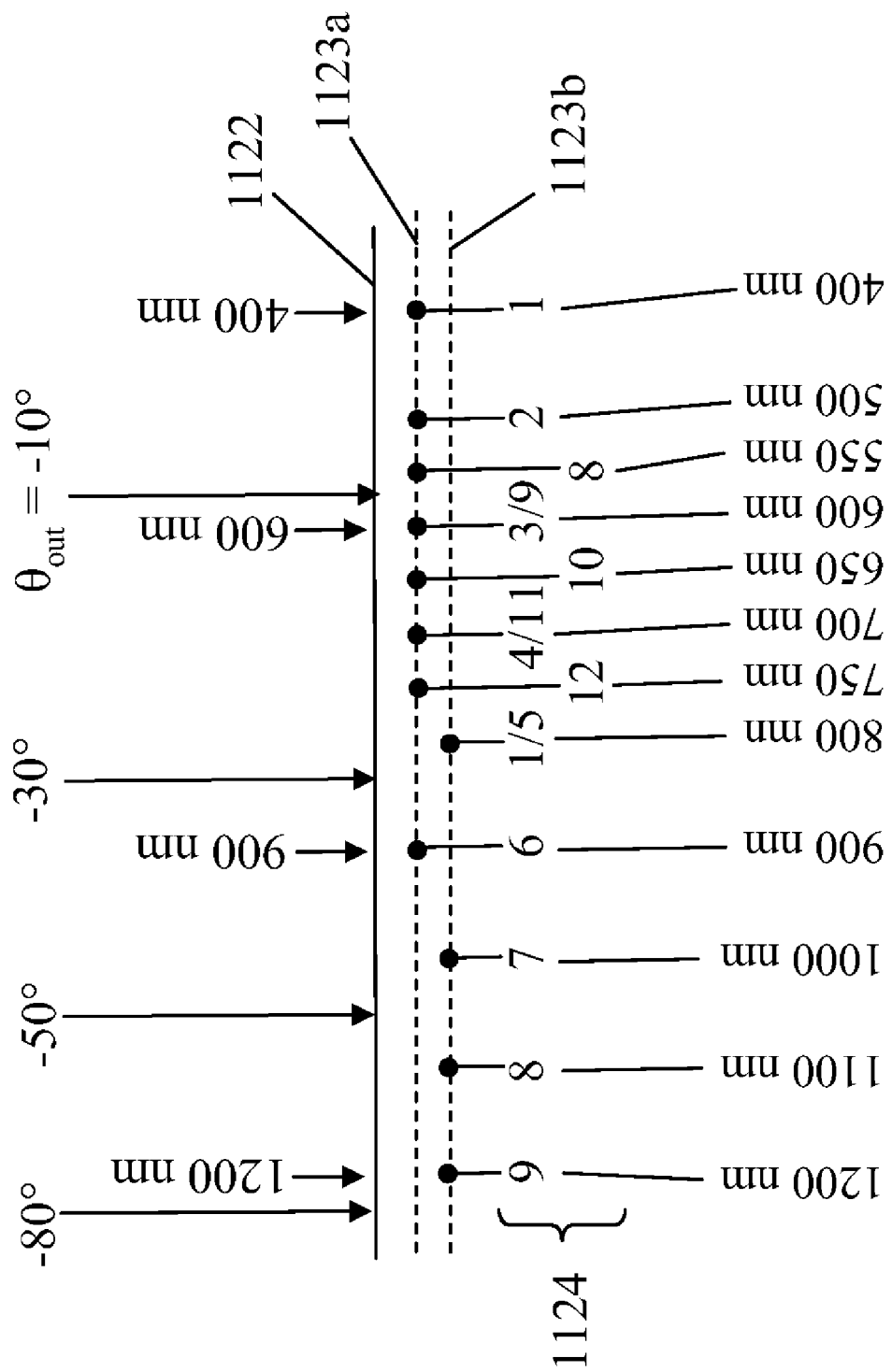

If the grating lines of the reference gratings 1104 are tilted by suitably calculated amounts relative to the primary grating lines (e.g., using Eqs. 2a and 2b), their respective diffracted signals can be arranged to fall along one or more lines parallel to but vertically displaced from the dispersion line 1122 of the primary grating 1102 (two such displaced parallel lines shown in the example of FIG. 11C). For a desired calibration reference position, a component (parallel to the plane of incidence) of the corresponding reference grating wavevector can be calculated using Eq. 5. A wavevector component orthogonal to the plane of incidence, chosen to yield the desired displacement of the calibration reference mark 1124 from the primary grating dispersion line 1122, is added to the parallel component to yield a the grating wavevector magnitude and direction. This process is repeated for each reference grating to provide additional calibration reference marks. Using the same orthogonal reference wavevector component for results in calibration reference marks lying along a line parallel to the primary grating dispersion line 1122. This computation is exemplary, and any suitable algorithm for calculating the proper tilt and spacing for a reference grating to provide a reference mark at a desired location falls within the scope of the present disclosure or appended claims.

The diffracted signals can be detected using two or more one-dimensional photodetector arrays or a single two-dimensional photodetector array. Separation of the calibration reference signals 1124 from the dispersion line 1122 eliminates interference (i.e., "cross-talk") between the reference signals and the diffracted output of the primary grating 1102. The reference gratings 1124 need not be blocked or shuttered when spectra are acquired in this arrangement. A schematic representative output pattern produced by grating 1100 with tilted reference grating lines is shown in FIG. 11C. Corresponding exemplary grating parameters are given in the fourth and fifth columns of Table IV and are similar to those producing the output pattern shown in FIG. 11B, except that the calibration reference markers 1124 fall along the two lines 1123a/b that are parallel to but vertically displaced from the dispersion line 1122 of the primary grating 1102 (horizontal solid line). A two-dimensional photodetector array and a HeNe laser can be employed to fully calibrate the dispersion line 112 of the primary grating 1102. As I the previous example, another reference wavelength can be employed, but will change the correspondence between a given calibration reference marker 1124 and the corresponding wavelength diffracted to that position by the primary grating 1102. The vertical separation between the calibration reference markers 1124 and the primary grating dispersion line 1122 is exaggerated in FIG. 11C for clarity. Typically the separation is set by an angular offset factor of only a few degrees and the focal length of the focusing elements employed. As with the previous example, other reference wavelengths, gratings spacings, and incidence angles can be employed within the scope of the present disclosure or appended claims.

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" or "a dog or a cat or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising", "including", and "having" shall be construed as open ended terminology, with the same meaning as if the phrase "at least" were appended after each instance thereof.

What is claimed is:

1. An optical apparatus comprising:
a first diffraction grating formed on or within a grating substrate and comprising a first set of diffractive elements that are substantially straight and substantially parallel to one another and that are characterized by a first grating wavevector; and
a second diffraction grating formed on or within the same grating substrate as the first diffraction grating and comprising a second set of diffractive elements that are substantially straight, substantially parallel to one another, and not parallel to the diffractive elements of the first set, and that are characterized by a second grating wavevector that is not parallel to the first grating wavevector, wherein:
the first diffraction grating is arranged on or within the grating substrate so as to diffract as a freely propagating optical beam and disperse spatially according to wavelength at least a first portion of an optical signal incident as a freely propagating optical beam on the first diffraction grating at an input incidence angle;
the second diffraction grating is arranged on or within the grating substrate so as to diffract as a freely propagating optical beam and disperse spatially according to wavelength at least a second portion of the optical signal incident as a freely propagating optical beam on the second diffraction grating at the input incidence angle; and
the first and second diffraction gratings are arranged on or within the grating substrate so that the first and second diffracted portions of the optical signal are dispersed along corresponding first and second dispersion directions that are not parallel to one another.

2. An optical apparatus comprising:
one or more primary diffraction gratings formed on or within a grating substrate, each of the one or more primary diffraction gratings comprising a corresponding set of primary diffractive elements; and
one or more reference diffraction gratings formed on or within the same grating substrate as the one or more primary diffraction gratings, each of the one or more reference diffraction gratings comprising a corresponding set of reference diffractive elements,
wherein:
each of the one or more reference diffraction gratings is arranged on or within the grating substrate so as to diffract as a freely propagating optical beam and disperse spatially according to wavelength one or more corresponding portions of known corresponding reference wavelengths of a reference optical signal incident as a freely propagating optical beam on the one or more reference diffraction gratings at an input incidence angle;
each of the one or more primary diffraction gratings is arranged on or within the grating substrate so as to diffract as a freely propagating optical beam and disperse spatially according to wavelength one or more corresponding portions of an input optical signal incident as a freely propagating optical beam on the one or more primary diffraction gratings at the input incidence angle;
each of the one or more primary diffraction gratings differs from at least one of the one or more reference diffraction gratings with respect to magnitude or direction of corresponding wavelength spatial dispersion; and
the one or more reference diffraction gratings and the one or more primary diffraction gratings are arranged on or within the grating substrate so that the one or more diffracted and spatially dispersed portions of the reference optical signal of known corresponding reference wavelengths define one or more spatial wavelength calibration references for one or more portions of the input optical signal that are diffracted and spatially dispersed simultaneously with diffraction and spatial dispersion of portions of the reference optical signal.

3. The apparatus of claim 2 further comprising one or more additional reference diffraction gratings formed on the same grating substrate as the one or more reference and primary diffraction gratings, each of the one or more additional reference diffraction gratings comprising a corresponding additional set of reference diffractive elements, wherein:
each of the one or more additional reference diffraction gratings is arranged on or within the grating substrate so as to diffract as a freely propagating optical beam and disperse spatially according to wavelength one or more corresponding additional portions of known corresponding reference wavelengths of the reference optical signal;
each of the one or more primary diffraction gratings differs from at least one of the one or more additional reference diffraction gratings with respect to magnitude or direction of the corresponding wavelength spatial dispersion; and
the one or more primary diffraction gratings and the one or more additional reference diffraction gratings are arranged on or within the grating substrate so that the corresponding one or more diffracted and spatially dispersed additional portions of the reference optical signal of known corresponding reference wavelengths define one or more additional spatial wavelength calibration references for the one or more portions of the input optical signal that are diffracted and spatially dispersed simultaneously with diffraction and spatial dispersion of additional portions of the reference optical signal.

4. The apparatus of claim 3 wherein at least one of the one or more reference diffraction gratings and at least one of the one or more additional reference diffraction gratings occupy corresponding spatially distinct, non-contiguous areas of the grating substrate and exhibit substantially identical magnitude and direction of the corresponding wavelength spatial dispersion.

5. The apparatus of claim 3 wherein:
at least one of the one or more reference diffraction gratings and at least one of the one or more additional reference diffraction gratings differ from one another with respect to magnitude or direction of the corresponding wavelength spatial dispersion, and the one or more primary, reference, and additional reference diffraction gratings are arranged on or within the grating substrate so that the corresponding portions of the reference optical signal of known corresponding reference wavelengths that are diffracted and spatially dispersed by the one or more reference and additional reference diffraction gratings define a spatial wavelength calibration scale for the one or more portions of the input optical signal that are diffracted and spatially dispersed simultaneously with diffraction and spatial dispersion of portions of the reference optical signal.

6. The apparatus of claim 2 further comprising one or more additional primary diffraction gratings formed on the same grating substrate as the one or more reference and primary diffraction gratings, each of the one or more additional primary diffraction gratings comprising a corresponding additional set of primary diffractive elements, wherein:
   each of the one or more additional primary diffraction gratings is arranged on or within the grating substrate so as to diffract as a freely propagating optical beam and disperse spatially according to wavelength one or more corresponding additional portions of the input optical signal;
   each of the one or more additional primary diffraction gratings differs from at least one of the one or more primary diffraction gratings with respect to magnitude or direction of the corresponding wavelength spatial dispersion;
   each of the one or more additional primary diffraction gratings differs from at least one of the one or more reference diffraction gratings with respect to magnitude or direction of the corresponding wavelength spatial dispersion; and
   the one or more reference diffraction gratings and the one or more additional primary diffraction gratings are arranged on or within the grating substrate so that the one or more diffracted and spatially dispersed portions of the reference optical signal of known corresponding reference wavelengths define one or more spatial wavelength calibration references for one or more additional portions of the input optical signal diffracted and spatially dispersed by the one or more additional primary diffraction gratings simultaneously with diffraction and spatial dispersion of portions of the reference optical signal.

7. The apparatus of claim 6 wherein each of the one or more primary and additional primary diffraction gratings is a crossed diffraction grating.

8. The apparatus of claim 2 wherein:
   the corresponding primary diffractive elements of each of the one or more primary diffraction gratings are substantially straight, substantially parallel to one another, and substantially uniformly spaced apart;
   the corresponding reference diffractive elements of each of the one or more reference diffraction gratings are substantially straight, substantially parallel to one another and to the diffractive elements of the one or more primary diffraction gratings, and substantially uniformly spaced apart; and
   each of the one or more primary diffraction gratings differs from at least one of the one or more reference diffraction gratings with respect to spacing of its corresponding diffractive elements.

9. The apparatus of claim 2 wherein:
   the corresponding primary diffractive elements of each of the one or more primary diffraction gratings are substantially straight, substantially parallel to one another, substantially uniformly spaced apart, and characterized by a corresponding primary grating wavevector;
   the corresponding reference diffractive elements of each of the one or more reference diffraction gratings are substantially straight, substantially parallel to one another, substantially uniformly spaced apart, and characterized by a corresponding reference grating wavevector; and
   the one or more primary diffraction gratings and the one or more reference diffraction gratings are arranged on or within the grating substrate so that each primary grating wavevector is not parallel to at least one reference grating wavevector.

10. The apparatus of 2 wherein the grating substrate is substantially flat.

11. The apparatus of claim 10 wherein:
   at least one of the one or more primary diffraction gratings is arranged so as to result in curvature of the wavefront of the corresponding diffracted and spatially dispersed portion of the input optical signal that differs from curvature of the wavefront of the input optical signal; and
   at least one of the one or more reference diffraction gratings is arranged so as to result in curvature of the wavefront of the corresponding diffracted and spatially dispersed portion of the reference optical signal that differs from curvature of the wavefront of the reference optical signal.

12. The apparatus of claim 10 wherein:
   at least one of the one or more primary diffraction gratings is arranged so as to provide conjugate imaging of the corresponding diffracted and spatially dispersed portion of the input optical signal; and
   at least one of the one or more reference diffraction gratings is arranged so as to provide conjugate imaging of the corresponding diffracted and spatially dispersed portion of the reference optical signal.

13. The apparatus of claim 10 wherein the corresponding diffractive elements of at least one of the one or more reference or primary diffraction gratings are curved or are non-uniformly spaced apart.

14. The apparatus of claim 2 wherein the one or more reference and primary diffraction gratings are arranged so that a corresponding dispersion line defined by one of the one or more primary diffraction gratings is offset in the far field from at least one of the one or more spatial wavelength calibration references.

15. A method for making an optical apparatus, the method comprising:
   forming a first diffraction grating on or within a grating substrate, the first diffraction grating comprising a first set of diffractive elements that are substantially straight and substantially parallel to one another and that are characterized by a first grating wavevector; and
   forming a second diffraction grating on or within the same grating substrate as the first diffraction grating, the second diffraction grating comprising a second set of diffractive elements that are substantially straight, substantially parallel to one another, and not parallel to the diffractive elements of the first set, and that are characterized by a second grating wavevector that is not parallel to the first grating wavevector,
   wherein:
   the first diffraction grating is arranged on or within the grating substrate so as to diffract as a freely propagating optical beam and disperse spatially according to wavelength at least a first portion of an optical signal incident as a freely propagating optical beam on the first diffraction grating at an input incidence angle;

the second diffraction grating is arranged on or within the grating substrate so as to diffract as a freely propagating optical beam and disperse spatially according to wavelength at least a second portion of the optical signal incident as a freely propagating optical beam on the second diffraction grating at the input incidence angle; and the first and second diffraction gratings are arranged on or within the grating substrate so that the first and second diffracted portions of the optical signal are dispersed along corresponding first and second dispersion directions that are not parallel to one another.

16. A method for making an optical apparatus, the method comprising:

forming one or more primary diffraction gratings on or within a grating substrate, each of the one or more primary diffraction gratings comprising a corresponding set of primary diffractive elements; and forming one or more reference diffraction gratings on or within the same grating substrate as the one or more primary diffraction gratings, each of the one or more reference diffraction gratings comprising a corresponding set of reference diffractive elements, wherein:

each of the one or more reference diffraction gratings is arranged on or within the grating substrate so as to diffract as a freely propagating optical beam and disperse spatially according to wavelength one or more corresponding portions of known corresponding reference wavelengths of a reference optical signal incident as a freely propagating optical beam on the one or more reference diffraction gratings at an input incidence angle;

each of the one or more primary diffraction gratings is arranged on or within the grating substrate so as to diffract as a freely propagating optical beam and disperse spatially according to wavelength one or more corresponding portions of an input optical signal incident as a freely propagating optical beam on the one or more primary diffraction gratings at the input incidence angle;

each of the one or more primary diffraction gratings differs from at least one of the one or more reference diffraction gratings with respect to magnitude or direction of corresponding wavelength spatial dispersion; and the one or more reference diffraction gratings and the one or more primary diffraction gratings are arranged on or within the grating substrate so that the one or more diffracted and spatially dispersed portions of the reference optical signal of known corresponding references wavelengths define one or more spatial wavelength calibration references for one or more portions of the input optical signal that are diffracted and spatially dispersed simultaneously with diffraction and spatial dispersion of portions of the reference optical signal.

17. The method of claim 16 wherein the one or more primary and reference diffraction gratings are formed simultaneously.

18. The method of claim 17 wherein the one or more primary and reference diffraction gratings are formed by photolithography.

19. The method of claim 17 wherein the one or more primary and reference diffraction gratings are formed by reduction photolithography.

20. The method of claim 17 wherein the one or more primary and reference diffraction gratings are reproduced from a master.

21. A method for using an optical apparatus, the method comprising:

diffracting as a freely propagating optical beam and dispersing spatially according to wavelength at least a first portion of an optical signal incident as a freely propagating optical beam on a first diffraction grating at an input incidence angle, the first diffraction grating being formed on or within a grating substrate and comprising a first set of diffractive elements that are substantially straight and substantially parallel to one another and are characterized by a first grating wavevector; and diffracting as a freely propagating optical beam and dispersing spatially according to wavelength at least a second portion of the optical signal incident as a freely propagating optical beam on a second diffraction grating at the input incidence angle, the second diffraction grating being formed on or within the same grating substrate as the first diffraction grating and comprising a second set of diffractive elements that are substantially straight, substantially parallel to one another, and not parallel to the diffractive elements of the first set, and that are characterized by a second grating wavevector that is not parallel to the first grating wavevector, wherein the first and second diffraction gratings are arranged on or within the grating substrate so that the first and second diffracted portions of the optical signal are dispersed along corresponding first and second dispersion directions that are not parallel to one another.

22. A method for using an optical apparatus, the method comprising:

with each of one or more primary diffraction gratings, diffracting as a freely propagating optical beam and dispersing spatially according to wavelength one or more corresponding portions of an input optical signal incident as a freely propagating optical beam on the one or more primary diffraction gratings at an input incidence angle, each of the one or more primary diffraction gratings being formed on or within a grating substrate and comprising a corresponding set of primary diffractive elements; and with each of one or more reference diffraction gratings, diffracting as a freely propagating optical beam and dispersing spatially according to wavelength one or more corresponding portions of known corresponding reference wavelengths of a reference optical signal incident as a freely propagating optical beam on the one or more reference diffraction gratings at the input incidence angle, each of the one or more reference diffraction gratings being formed on or within the same grating substrate as the one or more primary diffraction gratings and comprising a corresponding set of reference diffractive elements, wherein:

each of the one or more primary diffraction gratings differs from at least one of the one or more reference diffraction gratings with respect to magnitude or direction of corresponding wavelength spatial dispersion; and the one or more reference diffraction gratings and the one or more primary diffraction gratings are arranged on or within the grating substrate so that the one or more diffracted and spatially dispersed portions of the reference optical signal of know corresponding reference wavelengths define one or more spatial wavelength calibration references for one or more portions of the input optical signal that are diffracted and spatially dispersed simultaneously with diffraction and spatial dispersion of portions of the reference optical signal.

23. The method of claim 22 further comprising:
with each of one or more additional primary diffraction gratings, diffracting as a freely propagating optical beam and dispersing spatially according to wavelength one or more corresponding additional portions of the input optical signal incident as a freely propagating optical beam on the one or more additional primary diffraction gratings at the input incidence angle, each of the one or more additional primary diffraction gratings being formed on or within the same grating substrate as the one or more primary diffraction gratings and comprising a corresponding additional set of primary diffractive elements, wherein the one or more diffracted and dispersed portions of the input optical signal are dispersed by the one or more primary and additional primary diffraction gratings along corresponding dispersion directions that are not parallel to one another but are within about ±4.5° of one another; and
dispersing, with a prism or with another diffraction grating, the one or more diffracted and dispersed portions of the incident input optical signal spatially according to wavelength in a direction substantially orthogonal to the directions along which the one or more diffracted and dispersed portions of the input optical signal are dispersed by the one or more primary and additional primary diffraction gratings.

24. The method of claim 22 further comprising:
with each of one or more additional primary diffraction gratings, diffracting as a freely propagating optical beam and dispersing spatially according to wavelength one or more corresponding portions of the input optical signal incident as a freely propagating optical beam on the one or more additional primary diffraction gratings at the input incidence angle, each of the one or more additional primary diffraction gratings being formed on or within the same grating substrate as the one or more primary diffraction gratings and comprising a corresponding additional set of primary diffractive elements; and
routing the one or more diffracted and dispersed portions of the input optical signal and reference optical signal onto a photodetector array,
wherein:
the one or more diffracted and dispersed portions of the input optical signal and the one or more diffracted and dispersed portions of the reference optical signal are each routed to corresponding spatially distinct regions of the photodetector array; and
respective portions of the input optical signal diffracted and dispersed by the one or more primary diffraction gratings and by the one or more additional primary diffraction gratings are routed to corresponding spatially distinct regions of the photodetector array.

25. The method of claim 22 further comprising routing the one or more diffracted and dispersed portions of the input optical signal and the one or more diffracted and dispersed portions of the reference optical signal onto a photodetector array.

26. The method of claim 25 wherein the one or more diffracted and dispersed portions of the input optical signal and the one or more diffracted and dispersed portions of the reference optical signal are each routed to corresponding spatially distinct regions of the photodetector array.

27. An optical apparatus comprising:
a first diffraction grating formed on or within a grating substrate and comprising a first set of diffractive elements that are substantially straight and substantially parallel to one another and that are characterized by a first grating wavevector;
a second diffraction grating formed on or within the same grating substrate as the primary diffraction grating and comprising a second set of diffractive elements that are substantially straight, substantially parallel to one another, and not parallel to the diffractive elements of the first set, and that are characterized by a second grating wavevector that is not parallel to the first grating wavevector;
an input optical port arranged to admit an optical signal incident as a freely propagating optical beam on the first diffraction grating at an input incidence angle and incident as a freely propagating optical beam on the second diffraction grating at the input incidence angle; and
a photodetector array,
wherein:
the first diffraction grating is arranged on or within the grating substrate so as to diffract as a freely propagating optical beam and disperse spatially according to wavelength at least a first portion of the optical signal;
the second diffraction grating is arranged on or within the grating substrate so as to diffract as a freely propagating optical beam and disperse spatially according to wavelength at least a second portion of the optical signal;
the first and second diffraction gratings are arranged on or within the grating substrate so that the first and second diffracted portions of the optical signal are dispersed along corresponding first and second dispersion directions that are not parallel to one another; and
the photodetector array is arranged to receive the first and second diffracted portions of the optical signal.

28. An optical apparatus comprising:
one or more primary diffraction gratings formed on or within a grating substrate, each of the one or more primary diffraction gratings comprising a corresponding set of primary diffractive elements; and
one or more reference diffraction gratings formed on or within the same grating substrate as the one or more primary diffraction gratings, each of the one or more reference diffraction gratings comprising a corresponding set of reference diffractive elements;
an input optical port arranged to admit an input optical signal incident as a freely propagating optical beam on the one or more primary diffraction gratings at an input incidence angle and to admit a reference optical signal incident as a freely propagating optical beam on the one or more reference diffraction gratings at the input incidence angle; and
a photodetector array,
wherein:
each of the one or more reference diffraction gratings is arranged on or within the grating substrate so as to diffract as a freely propagating optical beam and disperse spatially according to wavelength one or more corresponding portions of known corresponding reference wavelengths of the reference optical signal;
each of the one or more primary diffraction gratings is arranged on or within the grating substrate so as to diffract as a freely propagating optical beam and disperse spatially according to wavelength one or more corresponding portions of the input optical signal;
each of the one or more primary diffraction gratings differs from at least one of the one or more reference diffraction gratings with respect to magnitude or direction of corresponding wavelength spatial dispersion;

the photodetector array is arranged to receive one or more diffracted and spatially dispersed portions of the reference optical signal and to receive one or more diffracted and spatially dispersed portions of the input optical signal; and the one or more reference diffraction gratings, the one or more primary diffraction gratings, and the photodetector array are arranged so that the one or more diffracted and spatially dispersed portions of the reference optical signal of known corresponding reference wavelengths define on the photodetector array one or more spatial wavelength calibration references for one or more portions of the input optical signal that are diffracted and spatially dispersed simultaneously with diffraction and spatial dispersion of portions of the reference optical signal and incident on the photodetector array.

29. The apparatus of claim 28 further comprising:

one or more additional primary diffraction gratings formed on or within the same substrate as the one or more primary diffraction gratings, wherein the one or more primary and additional primary diffraction gratings are arranged on or within the grating substrate so that one or more diffracted and dispersed portions of the input optical signal are dispersed by the one or more primary and additional primary diffraction gratings along corresponding dispersion directions that are not parallel to one another but are within about ±4.5° of one another; and a prism or another diffraction grating arranged so as to disperse the one or more diffracted and dispersed portions of the incident input optical signal spatially according to wavelength in a direction substantially orthogonal to the directions along which the one or more diffracted and dispersed portions of the input optical signal are dispersed by the one or more primary and additional primary diffraction gratings.

30. The apparatus of claim 28 further comprising one or more additional primary diffraction gratings formed on or within the same substrate as the one or more primary diffraction gratings, wherein:

the one or more primary, additional primary, and reference diffraction gratings are arranged on or within the grating substrate so as to route the corresponding diffracted and dispersed portions of the input optical signal and reference optical signal to corresponding spatially distinct regions of the photodetector array; and the one or more primary and additional primary diffraction gratings are arranged so as to route respective portions of the input optical signal diffracted and dispersed by the one or more primary and additional primary diffraction gratings to corresponding spatially distinct regions of the photodetector array.

31. The apparatus of claim 28 wherein the one or more primary and additional primary diffraction gratings are arranged so that the one or more diffracted and dispersed portions of the input optical signal and reference optical signal are each routed to corresponding spatially distinct regions of the photodetector array.

32. The apparatus of claim 1 further comprising a reference diffraction grating formed on or within the grating substrate and comprising a set of reference diffractive elements that are substantially straight, substantially parallel to one another, characterized by a reference grating wavevector, and substantially parallel to the diffractive elements of either the first set or the second set, so that the reference grating wavevector is parallel to either the first or second grating wavevector.

33. The apparatus of claim 1 further comprising a reference diffraction grating formed on or within the grating substrate and comprising a set of reference diffractive elements that are substantially straight, substantially parallel to one another, characterized by a reference grating wavevector, not parallel to the diffractive elements of the first set, and not parallel to the diffractive elements of the second set, so that the reference grating wavevector is not parallel to the first grating wavevector and not parallel to the second grating wavevector.

34. The method of claim 15 further comprising forming a reference diffraction grating on or within the grating substrate, the reference diffraction grating comprising a set of reference diffractive elements that are substantially straight, substantially parallel to one another, characterized by a reference grating wavevector, and substantially parallel to the diffractive elements of either the first set or the second set, so that the reference grating wavevector is parallel to either the first or second grating wavevector.

35. The method of claim 15 further comprising forming a reference diffraction grating on or within the grating substrate, the reference diffraction grating comprising a set of reference diffractive elements that are substantially straight, substantially parallel to one another, characterized by a reference grating wavevector, not parallel to the diffractive elements of the first set, and not parallel to the diffractive elements of the second set, so that the reference grating wavevector is not parallel to the first grating wavevector and not parallel to the second grating wavevector.

36. The method of claim 21 further comprising diffracting and dispersing spatially at least a portion of a reference optical signal incident on a reference diffraction grating, the reference diffraction grating being formed on or within the grating substrate, the reference diffraction grating comprising a set of reference diffractive elements that are substantially straight, substantially parallel to one another, characterized by a reference grating wavevector, and substantially parallel to the diffractive elements of either the first set or the second set, so that the reference grating wavevector is parallel to either the first or second grating wavevector.

37. The method of claim 21 further comprising diffracting and dispersing spatially at least a portion of a reference optical signal incident on a reference diffraction grating, the reference diffraction grating being formed on or within the grating substrate, the reference diffraction grating comprising a set of reference diffractive elements that are substantially straight, substantially parallel to one another, characterized by a reference grating wavevector, not parallel to the diffractive elements of the first set, and not parallel to the diffractive elements of the second set, so that the reference grating wavevector is not parallel to the first grating wavevector and not parallel to the second grating wavevector.

38. The apparatus of claim 27 further comprising a reference diffraction grating formed on or within the grating substrate and comprising a set of reference diffractive elements that are substantially straight, substantially parallel to one another, characterized by a reference grating wavevector, and substantially parallel to the diffractive elements of either the first set or the second set, so that the reference grating wavevector is parallel to either the first or second grating wavevector.

39. The apparatus of claim 27 further comprising a reference diffraction grating formed on or within the grating substrate and comprising a set of reference diffractive elements that are substantially straight, substantially parallel to one another, characterized by a reference grating wavevector, not parallel to the diffractive elements of the first set, and not parallel to the diffractive elements of the second set, so that the reference grating wavevector is not parallel to the first grating wavevector and not parallel to the second grating wavevector.

40. The apparatus of claim 2 wherein each of the one or more primary diffraction gratings differs from at least one of the one or more reference diffraction gratings with respect to direction of corresponding wavelength spatial dispersion.

41. The apparatus of claim 2 wherein each of the one or more primary diffraction gratings differs from at least one of the one or more reference diffraction gratings with respect to magnitude of corresponding wavelength spatial dispersion.

42. The method of claim 16 wherein each of the one or more primary diffraction gratings differs from at least one of the one or more reference diffraction gratings with respect to direction of corresponding wavelength spatial dispersion.

43. The method of claim 16 wherein each of the one or more primary diffraction gratings differs from at least one of the one or more reference diffraction gratings with respect to magnitude of corresponding wavelength spatial dispersion.

44. The method of claim 22 wherein each of the one or more primary diffraction gratings differs from at least one of the one or more reference diffraction gratings with respect to direction of corresponding wavelength spatial dispersion.

45. The method of claim 22 wherein each of the one or more primary diffraction gratings differs from at least one of the one or more reference diffraction gratings with respect to magnitude of corresponding wavelength spatial dispersion.

46. The apparatus of claim 28 wherein each of the one or more primary diffraction gratings differs from at least one of the one or more reference diffraction gratings with respect to direction of corresponding wavelength spatial dispersion.

47. The apparatus of claim 28 wherein each of the one or more primary diffraction gratings differs from at least one of the one or more reference diffraction gratings with respect to magnitude of corresponding wavelength spatial dispersion.

* * * * *